US008897496B2

(12) United States Patent
Hildreth

(10) Patent No.: US 8,897,496 B2
(45) Date of Patent: Nov. 25, 2014

(54) HOVER DETECTION

(71) Applicant: QUALCOMM Incorporated, San Diego, CA (US)

(72) Inventor: Evan Robert Hildreth, Ottawa (CA)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/934,734

(22) Filed: Jul. 3, 2013

(65) Prior Publication Data

US 2014/0028628 A1 Jan. 30, 2014

Related U.S. Application Data

(63) Continuation of application No. 12/900,183, filed on Oct. 7, 2010, now Pat. No. 8,515,128.

(60) Provisional application No. 61/249,527, filed on Oct. 7, 2009.

(51) Int. Cl.
*G06K 9/00* (2006.01)
*G06F 3/01* (2006.01)
*G06F 3/042* (2006.01)
*G06F 3/03* (2006.01)
*G09G 5/00* (2006.01)

(52) U.S. Cl.
CPC .............. *G06F 3/0421* (2013.01); *G06F 3/017* (2013.01); *G06F 3/0428* (2013.01); *G06F 3/0304* (2013.01)
USPC ........................................... 382/103; 345/156

(58) Field of Classification Search
USPC .......... 382/100, 103, 107, 236; 348/154, 155, 348/169, 170, 172; 356/156, 157, 158
See application file for complete search history.

(56) References Cited

U.S. PATENT DOCUMENTS

| | | | |
|---|---|---|---|
| 5,982,352 A | 11/1999 | Pryor | |
| 6,157,368 A | 12/2000 | Fager | |
| 6,393,136 B1 | 5/2002 | Amir et al. | |
| 6,624,833 B1 | 9/2003 | Kumar et al. | |
| 6,707,444 B1 | 3/2004 | Hendriks et al. | |
| 6,961,443 B2 | 11/2005 | Mahbub | |
| 7,098,956 B2* | 8/2006 | Keitel et al. ................... | 348/370 |
| 7,259,747 B2* | 8/2007 | Bell ............................... | 345/156 |
| 7,292,711 B2 | 11/2007 | Kiraly et al. | |
| 7,526,131 B2 | 4/2009 | Weber | |
| 7,542,072 B2 | 6/2009 | DeMenthon | |
| 7,650,015 B2 | 1/2010 | Pirim | |
| 7,692,625 B2* | 4/2010 | Morrison et al. ............. | 345/156 |
| 8,068,641 B1 | 11/2011 | Hildreth | |
| 8,144,123 B2* | 3/2012 | Denoue et al. ................ | 345/157 |
| 8,515,128 B1 | 8/2013 | Hildreth | |
| 2002/0036617 A1 | 3/2002 | Pryor | |
| 2002/0097218 A1 | 7/2002 | Gutta et al. | |
| 2004/0032398 A1 | 2/2004 | Ariel et al. | |
| 2004/0070565 A1 | 4/2004 | Nayar et al. | |

(Continued)

*Primary Examiner* — Abolfazl Tabatabai

(74) *Attorney, Agent, or Firm* — Kilpatrick Townsend & Stockton LLP

(57) ABSTRACT

Hover detection technology, in which an image is captured from a camera while an illumination source is illuminating an area in front of a display surface and the image captured by the camera is analyzed to detect an object within an anticipated input region based on illumination of the illumination source. User input is determined based on the object detected within the anticipated input region and an application is controlled based on the determined user input.

30 Claims, 33 Drawing Sheets

(56) References Cited

U.S. PATENT DOCUMENTS

| | | |
|---|---|---|
| 2005/0122308 A1 | 6/2005 | Bell et al. |
| 2006/0033713 A1 | 2/2006 | Pryor |
| 2007/0091178 A1 | 4/2007 | Cotter et al. |
| 2008/0122786 A1 | 5/2008 | Pryor et al. |
| 2009/0103780 A1 | 4/2009 | Nishihara et al. |
| 2009/0122146 A1 | 5/2009 | Zalewsk et al. |
| 2009/0303176 A1 | 12/2009 | Chen et al. |
| 2010/0277412 A1 | 11/2010 | Pryor |
| 2011/0080490 A1 | 4/2011 | Clarkson et al. |
| 2011/0134237 A1 | 6/2011 | Belt |

* cited by examiner

HOVER DETECTION

CROSS-REFERENCE TO RELATED APPLICATIONS

This application is a continuation of U.S. patent application Ser. No. 12/900,183, filed Oct. 7, 2010 and entitled "Hover Detection", which claims priority from U.S. Provisional Patent Application Ser. No. 61/249,527, filed Oct. 7, 2009, entitled "Hover Detection." The entire contents of the previous applications are incorporated herein by reference for all purposes.

FIELD

The present disclosure generally relates to detecting objects hovering above a display as a mechanism for user input.

BACKGROUND

An input device or pointing device is a hardware component that allows a computer user to input data into a computer. A control (or widget) is an interface element that the computer user interacts with, such as by using an input device, to provide a single interaction point for the manipulation of data. A control may be used, for example, to view or manipulate computer images.

SUMMARY

Techniques are described for hover detection and multi-touch based input. The details of one or more implementations are set forth in the accompanying drawings and the description below. Other potential features and advantages of the disclosure will be apparent from the description and drawings.

DETAILED DESCRIPTION

In some implementations, a system is configured to track a user's finger or other object above a touch screen display device. Multiple light emitting diodes (LEDs) are provided at different angles with respect to a plane representing a front surface of the display device and one or more cameras are positioned to capture images of objects in front of the display device. The multiple LEDs may be pulsed sequentially in synchronization with a frame rate of the one or more cameras such that only one of the LEDs is illuminated in each captured image. The captured images are analyzed to detect a user's finger or other object in front the display device. A different portion of each image is analyzed based on which LED was illuminated when the corresponding image was captured. Detection of a user's finger or other object in front the display device may be used as user input to control an application.

Figure 1:
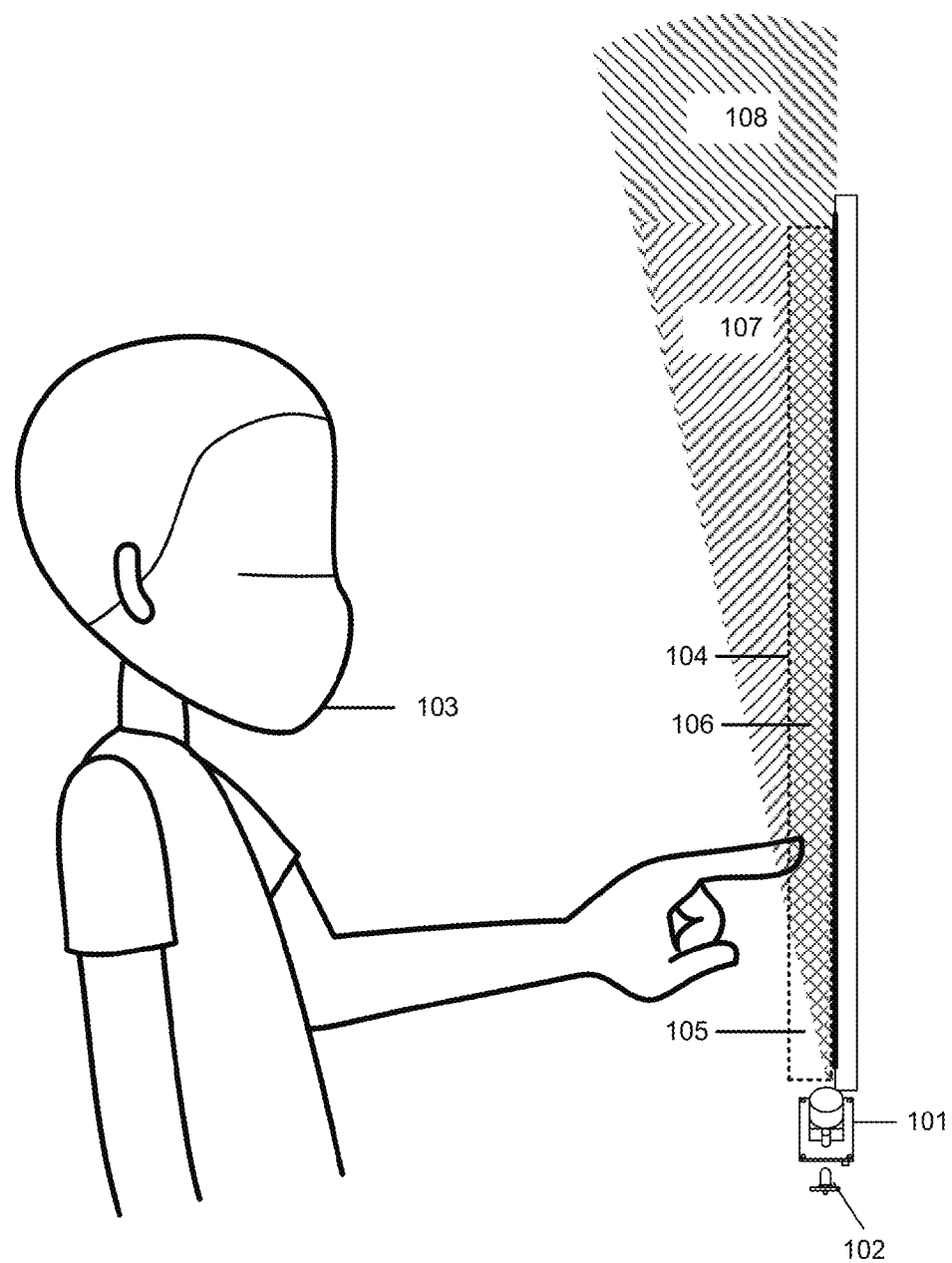
FIG. 1 illustrates an example of determining a user input based on detecting an object touching or hovering relatively close to a surface of a display screen.

FIG. 1 illustrates an example of determining a user input based on detecting an object touching or hovering relatively close to a surface of a display screen. As shown in FIG. 1, a system includes a camera 101 positioned at a bottom edge or side of a display screen and an illumination source 102 positioned at the bottom edge or side of the display screen. The camera 101 is oriented toward a top of the display screen such that a field of view of the camera 101 covers the front surface of the display screen. The illumination source 102 also is oriented toward the top of the display screen and emits light (e.g., infrared light) across the front surface of the display screen. The light emitted from the illumination source 102 intersects with the field of view of the camera 101 to enhance detection of touch inputs. Specifically, the width of the light (e.g., width of a beam of light) emitted from the illumination source 102 is narrower than a width of the field of view of the camera 101. Accordingly, the light emitted from the illumination source 102 intersects only a subset of the field of view of the camera 101 that is relatively close to the surface of the display screen (e.g., illuminates a portion of the field of view of the camera 101 that is within one inch of the surface of the display screen). In this regard, the illumination source 102 is oriented relative to the camera 101 to intersect a portion of the field of view of the camera 101 where objects are expected to be positioned when a user is providing a touch input and where objects are expected to be absent when a user is not providing a touch input. By analyzing images captured by the camera 101 for illuminated objects, the system is able to easily detect touch inputs and ignore other activity that is within the field of view of the camera 101, but too far from the surface of the display screen to be considered a touch input.

As shown in FIG. 1, a user 103 is providing a touch input to the display screen and a finger of the user 103 has entered an anticipated input region 104 (e.g., a rectangular target hover detection region). The light emitted from the illumination source 102 intersects the field of view of the camera 101 within the anticipated input region 104 to enhance detection of objects within the anticipated input region 104 while ignoring other objects outside of the anticipated input region 104.

A part 105 of the anticipated input region 104 (e.g., the target hover detection region) is not covered by the intersection of the light emitted from the illumination source 102 and the field of view of the camera 101 and, therefore, fingers (or other objects) within part 105 may not be detected. This deficiency may result from the relatively narrow beam of the illumination source 102. In some implementations, the system may be aware of the part 105 of the anticipated input region 104 and may control the display screen to avoid proper touch inputs in the part 105 of the anticipated input region 104. In these implementations, the system may control the display screen to avoid displaying control buttons or other input elements at a lower edge of the display screen and, instead, display control buttons or other input elements at a top edge of the display screen, where detection of touch inputs is more accurate.

A fingertip within the part 106 of the anticipated input region 104 may be detected. For instance, when the fingertip enters the part 106 of the anticipated input region 104, the fingertip is illuminated by the light emitted by the illumination source 102 while the camera 101 captures images. When the fingertip enters the part 106 of the anticipated input region 104, the system detects the fingertip as a touch input by analyzing the images captured by the camera 101 for illuminated objects and detecting the fingertip as an illuminated object with the images captured by the camera 101.

A fingertip within the area 107 in front of the anticipated input region 104 (e.g., the target hover detection region) may be imaged by the camera 101, but ignored because the fingertip is not within the anticipated input region 104 (e.g., the target hover detection region). For example, the system may analyze images captured by the camera 101 for illuminated objects and, because the area 107 is not illuminated by the light emitted from the illumination source 102, the fingertip within the area 107 is not detected as an illuminated object and easily ignored. In another example, the system may analyze images captured by the camera 101 for objects, detect the fingertip within the area 107, and determine that the fingertip within the area 107 is outside the anticipated input region 104 (e.g., the target hover detection region). The anticipated input region 104 (e.g., the target hover detection region) is designed to be relatively thin and close to the surface of the display screen. Therefore, the anticipated input region 104 (e.g., the target hover detection region) is unlikely to include parts of the user's body other than fingertips at a time when the user 103 is attempting to provide a touch input to the surface of the display screen.

A fingertip within the area 108 above the display screen may be detected, determined to be outside the anticipated input region 104 (e.g., the target hover detection region), and therefore ignored. Stationary objects above the display screen may be ignored using background modeling and subtraction. Some moving objects above the screen may interfere with tracking fingertips in front of the display screen. In other implementations, as described throughout this disclosure, the illumination source 102 may be positioned on a top edge or side of the display screen opposite of the camera 101, so that the intersection of the light emitted by the illumination source 102 and the field of view of the camera 101 does not extend outside of the edges or sides of the display screen.

Figure 2:
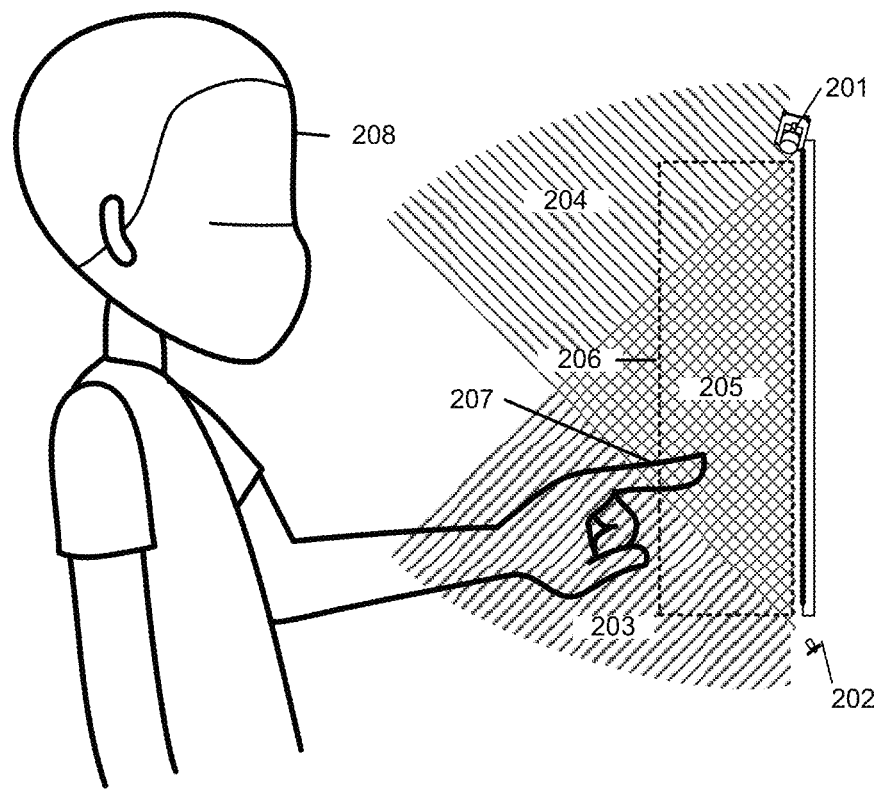
FIG. 2 illustrates an example of determining a user input based on detecting an object hovering relatively far from a surface of a display screen, as compared to the example shown in FIG. 1.

FIG. 2 illustrates an example of determining a user input based on detecting an object hovering relatively far from a surface of a display screen, as compared to the example shown in FIG. 1. For instance, although some applications may prefer detection of touch inputs as described above with respect to FIG. 1, other applications may prefer detection of user movements further from the display screen. Techniques similar to those described above with respect to FIG. 1 also may be used to enhance detection of user movements further from the display screen.

As shown in FIG. 2, a system includes a camera 201 positioned at a top edge or side of a display screen and an illumination source 202 positioned at a bottom edge or side of the display screen that is opposite of the camera 201. The camera 201 is angled downward from the top of the display screen such that a field of view of the camera 201 covers a first area 203 in front of the display screen (e.g., an area one to six inches from the surface of the display screen). The illumination source 202 is angled upward from the bottom of the display screen and emits light (e.g., infrared light) across a second area 204 in front of the display screen (e.g., an area one to six inches from the surface of the display screen). The light emitted from the illumination source 202 intersects with the field of view of the camera 201 to enhance detection of user inputs. Specifically, the light emitted from the illumination source 202 intersects only a subset of the field of view of the camera 201 at a location where objects are expected to be positioned when a user is providing input and where objects are expected to be absent when a user is not providing input. By analyzing images captured by the camera 201 for illuminated objects, the system is able to easily detect user inputs and ignore other activity that is within the field of view of the camera 201, but too far from the surface of the display screen to be considered an input.

As shown in FIG. 2, the first area 203 defined by the field of view of the camera 201 intersects the second area 204 defined by light emitted from the illumination source 202. Based on the intersection, an intersection area 205 is defined within an anticipated input region 206 (e.g., a target hover detection region). Any objects within the intersection area 205 are illuminated and may be detected within images captured by the camera 201. Other objects within the non-intersecting parts of the first area 203 (i.e., the camera's field of view) are not illuminated and therefore may be ignored. Similarly, other objects within the non-intersecting parts of the second area 204 (i.e., the illumination of the illumination source 202) are not imaged and therefore may be ignored.

In FIG. 2, a narrower-angle camera 201 and illumination source 202 are used to define the intersection area 205 to exclude the user's body 208, but include a majority of the anticipated input region 206 (e.g., the target hover detection region) where the user's fingertip 207 may be detected. As shown, the camera 201 images the user's fingertip 207 as well as other parts of the user's body 208 that are outside of the anticipated input region 206 (e.g., the target hover detection region). In addition, the illumination source 202 the user's fingertip 207 as well as other parts of the user's body 208 that are outside of the anticipated input region 206 (e.g., the target hover detection region). Although parts of the user's body 208 outside of the anticipated input region 206 (e.g., the target hover detection region) are imaged and other parts of the user's body 208 outside of the anticipated input region 206 (e.g., the target hover detection region) are illuminated, the user's fingertip 207 may be easily detected (and the other parts easily ignored) because the user's fingertip 207 is the only part of the user's body 208 that is within the anticipated input region 206 (e.g., the target hover detection region) and both imaged by the camera 201 and illuminated by the illumination source 202.

Although the intersection area 205 includes a majority of the anticipated input region 206 (e.g., the target hover detection region), significant parts of the anticipated input region 206 (e.g., the target hover detection region) are excluded from the intersection area 205, and the user's fingertip 207 may not be detected even though it is inside the anticipated input region 206 (e.g., the target hover detection region). Accordingly, a single intersection region may not closely approximate the shape of the rectangular anticipated input region 206 (e.g., the rectangular target hover detection region), and a single intersection region may not enable detection of a fingertip within the entire rectangular anticipated input region 206 (e.g., the rectangular target hover detection region) while excluding the user's body 208. As such, as described throughout this disclosure, multiple illumination sources and/or multiple cameras may be used and controlled together to define multiple intersection regions that better approximate the desired shape of the anticipated input region (e.g., the target hover detection region).

Figure 3:
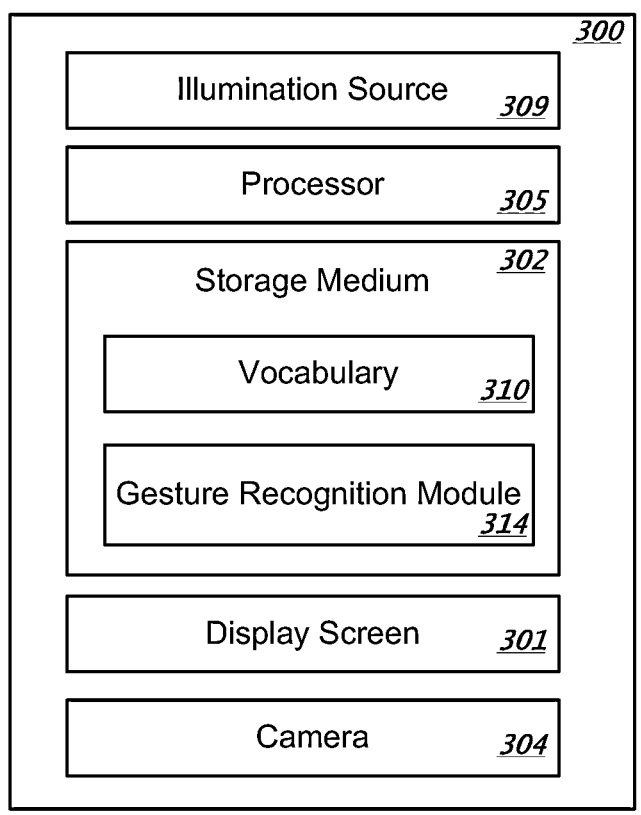
FIG. 3 illustrates an example of a tracking system.

FIG. 3 illustrates an example of a tracking system 300. The system 300 includes a display screen 301, a storage medium 302, a camera 304, a processor 305, and an illumination source 309. The system 300 may be included in or used in conjunction with a digital picture frame, a television, a monitor, a product display unit, or any type of media system.

The display screen 301 renders a visual display image. For example, the display screen 301 may be a monitor display, a television display, a liquid crystal display (LCD), a plasma display device, a projector with a projector screen, an autostereoscopic display, a cathode ray tube (CRT) display, a digital light processing (DLP) display, a digital picture frame display, or any other type of display device configured to render a visual display image. The display screen 301 may include one or more display devices. The display screen 301 may display images associated with an application. For instance, the display screen 301 may render display images generated by an application (e.g., a photo viewing application). The display images generated by the application may include a user interface with interface controls.

The camera 304 is a device that captures images. For example, the camera 304 may be a digital camera, a digital video camera, or any other type of device that captures images. In some implementations, the camera 304 may be a single camera and the system 300 may include only the single camera. In other implementations, multiple cameras may be used. The camera 304 may capture images of an object interacting with an interface displayed on the display screen 301. For instance, the camera 304 may capture images of a user or person physically interacting (e.g., with a finger or hand) with an interface displayed on the display screen 301. The camera 304 may be any type of image sensor and may be a line scan sensor.

The illumination source 309 is a device that provides a light source. For example, the illumination source 309 may be a flash device, an incandescent light bulb, a fluorescent light bulb, an LED, a halogen light source, a neon light source, a xenon light source, an infrared light source, or any other type of device configured to illuminate an object being imaged by the camera 304. A flash device may, over one or more cycles, project electromagnetic radiation and then extinguish the projected electromagnetic radiation.

The illumination source 309 may include one or more illuminators. The illumination source 309 may generate light to assist in capturing a high quality image of an object being captured by the camera 304. In some implementations, the illumination source 309 may be used in particular situations. For instance, the illumination source 309 may be used at nighttime or in dark rooms. The illumination source 309 may be positioned to define an intersection region within the field of view of the camera 304. Defining an intersection region using the illumination source 309 may increase the accuracy of object detection with a single camera and also may increase the number of control objects that may be detected by a single camera. Using a single camera may help reduce costs of the system and enable gesture-based input control to be realized in less expensive devices.

The storage medium 302 stores and records information or data, and may be an optical storage medium, magnetic storage medium, flash memory, or any other storage medium type. The storage medium 302 includes a vocabulary 310 and a gesture recognition module 314. The vocabulary 310 includes information regarding gestures that the system 300 may recognize. For example, the vocabulary 310 may include gesture definitions which describe, for each recognized gesture, a set of movements included in a gesture. The gesture recognition module 314 receives captured images from the camera 304, maps a position of a detected object to an interface displayed on the display screen 301, and detects a gesture based on comparing positions of the detected object within a series of images to gesture definitions stored in the vocabulary 310 to determine whether a recognizable gesture has been performed.

The processor 305 may accept input from a user interface displayed on the display screen 301 and may analyze images captured by the camera 304. The processor 305 may execute applications and operating systems being run on the system 300. The system 300 may include multiple processors (or other control circuitry) and may include memory (or other computer-readable storage media) that stores application programs, operating systems, user input programs, and data used by the application programs, operating systems, and user input programs.

In some implementations, the system 300 does not include the display screen 301. For example, the system 300 may be configured to detect objects in an intersection region where the intersection region is located in front of a different physical object such as a door, elevator, machine, radio, media player, or other object. In some examples, the system 300 is located in front of an area of space, such as a doorway or entryway.

Figure 4:
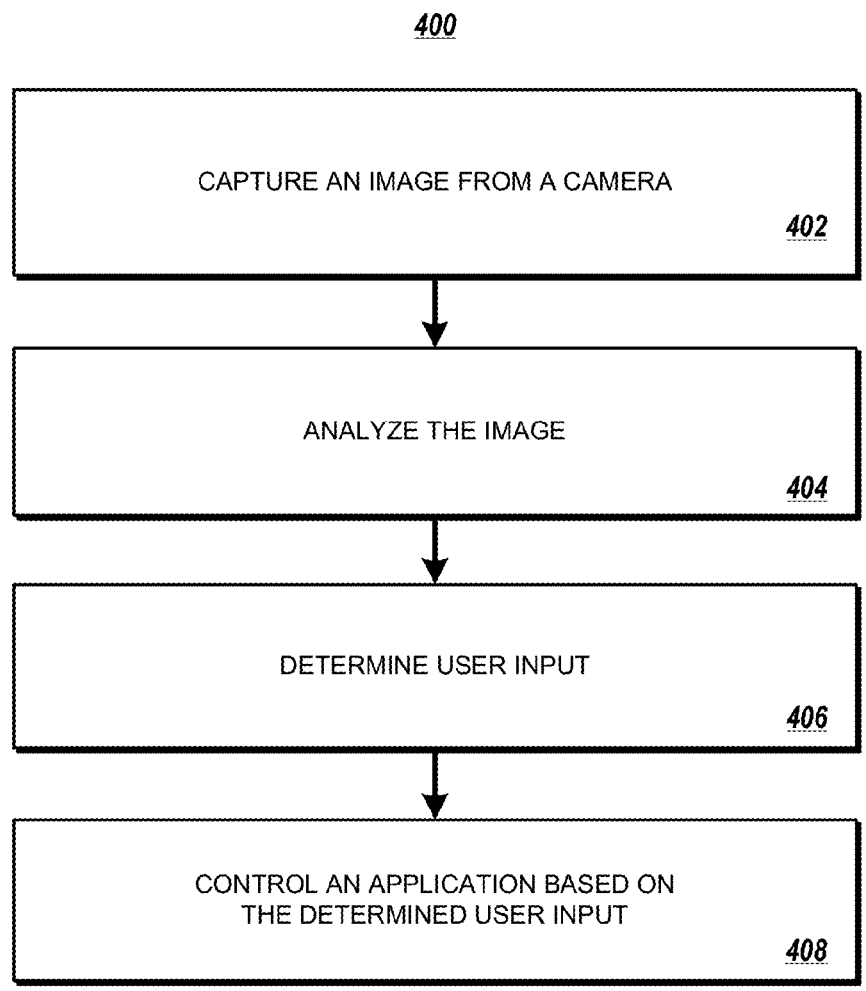
FIG. 4 illustrates a process for controlling an application.

FIG. 4 illustrates a process 400 for controlling an application. The operations of the process 400 are described generally as being performed by the system 300. The operations of the process 400 may be performed exclusively by the system 300, may be performed exclusively by another system, or may be performed by a combination of the system 300 and another system. In some implementations, operations of the process 400 may be performed by one or more processors included in one or more electronic devices.

The system 300 captures an image from a camera (402). For example, in reference to FIGS. 1 and 2, an image may be captured by the camera 101 or the camera 201. In some implementations, the system 300 may control the illumination source 102 or the illumination source 202 to illuminate while the camera 101 or the camera 201 is capturing an image (e.g., the illumination source 102 or the illumination source 202 may be turned on prior to the capturing of images by the camera 101 or the camera 201).

In some implementations, the illumination source is controlled to illuminate in sequence with images captured by the camera in an alternating pattern such that a first image captured by the camera is captured when the illumination source is illuminated and a second image captured by the camera is captured when the illumination source is not illuminated. The captured camera image may include an intersection region which is defined by the intersection of the field-of-view of the camera and an area illuminated by an illumination source.

In some implementations, the intersection region is located in front of a display screen. In other implementations, the intersection region is located in front of another type of object, such as a radio, elevator, painting, manufacturing device, automatic teller machine, light switch, vending machine, beverage dispenser, or any other physical object. In some implementations, the intersection region is located in front of an area of space, such as a doorway.

The intersection region may be positioned to correspond to an anticipated input region. The anticipated input region may be a location where objects are expected to be present when user input is being provided to the system 300 and where objects are expected to be absent when user input is being provided to the system 300. For instance, in implementations in which the anticipated user input is a touch of a display screen (or a relatively near hover above the display screen), the anticipated input region may be defined to cover the entire height and width of the display screen and extend out from the surface of the display screen for approximately one inch. Based on this anticipated input region, one or more cameras are positioned at one or more edges or sides of the display screen to capture images across the surface of the display screen. In addition, one or more illumination sources are positioned at one or more edges or sides of the display screen to illuminate an area that is one inch above the display screen. Accordingly, in these implementations, the system 300 is able to detect a touch input when a user places his or her finger within one inch of the display screen because, at that position, the user's finger is illuminated in images captured by the one or more cameras. Further, in these implementations, the system 300 is able to ignore instances in which a user is viewing the display screen and has not placed his or her finger within one inch of the display screen because, at that position, the user's finger is not illuminated in images captured by the one or more cameras.

In another example, the anticipated user input may be a relatively far hover above a display screen (e.g., placement of a finger between one to six inches above the display screen). In this example, the anticipated input region may be defined to cover the entire height and width of the display screen and occupy a volume that is spaced one inch from the surface of the display screen and extends to six inches from the surface of the display screen. Based on this anticipated input region, one or more cameras are positioned at one or more edges or sides of the display screen to capture images in front of the surface of the display screen. In addition, one or more illumination sources are positioned at one or more edges or sides of the display screen to illuminate an area in front of the display screen. Accordingly, in these implementations, the system 300 is able to detect an input when a user places his or her finger within one to six inches of the display screen because, at that position, the user's finger is illuminated in images captured by the one or more cameras. Further, in these implementations, the system 300 is able to ignore instances in which a user is viewing the display screen and has not placed his or her finger within one to six inches of the display screen because, at that position, the user's finger is not illuminated in images captured by the one or more cameras. Multiple cameras and multiple illumination sources may be used to more accurately define the anticipated input region.

The system 300 analyzes the image captured by the camera to detect an object within the anticipated input region based on illumination of the illumination source (404). For example, in reference to FIG. 1, the finger of the user 103 located within the anticipated input region 104 is detected while the head, arm, or torso of the user 103, which are located outside of the anticipated input region 104, are not detected. The system 300 may ignore objects that are within the camera's field of view and outside of the anticipated input region by analyzing the image for illuminated objects. Because any objects within the camera's field of view and outside of the anticipated input region are not illuminated, the system 300 ignores (e.g., does not detect) these objects.

In implementations where alternating camera images are captured while an illumination source is turned on, a camera image captured while the illumination source is turned off may be subtracted from a camera image captured while the illumination source was turned on to produce a resulting image. The resulting image may be analyzed to determine whether one or more objects are illuminated in the camera image captured when the illumination source was turned on. Subtracting the camera image captured when the illumination source was turned off may remove ambient light which was present in both camera images.

In some implementations, the system 300 detects an object within an image by analyzing multiple images taken over time to detect moving objects. The system 300 may use an optical flow process or examine a motion history image to detect objects in motion. In these implementations, the system 300 tracks the objects in motion and ignores static objects. For example, in a situation in which a user's hand and the user's face are present within an intersection region and the user is moving his or her hand while keeping his or her face stationary, the system 300 detects and tracks the moving hand as an object of interest, but does not track the user's face as an object of interest.

In some examples, the system 300 detects an object within an image by analyzing shapes within the image. In these examples, the system 300 may attempt to detect a finger within the anticipated input region of the image. In attempting to detect a finger, the system 300 may compare shapes of illuminated objects within the image to a shape of a typical finger. When the system determines that a shape of an illuminated object matches the shape of the typical finger, the system 300 detects and tracks the object as an object of interest. When the system determines that a shape of an illuminated object does not match the shape of the typical finger, the system 300 does not track the object as an object of interest.

The system 300 determines user input based on the object detected within the anticipated input region (406). For example, the system 300 may detect a touch input in response to detecting an illuminated object in the image captured by the camera. In this example, the system 300 may determine a position of the illuminated object in the image captured by the camera and use the determined position as a position on a display screen where the user is touching.

In some implementations, a gesture may be detected based on positions of the object detected within a series of images and a user input may be determined based on the recognized gesture. For example, a "swipe" user input may be detected and a "change station" user input may be determined based on the recognized swipe gesture. As another example, the position of the detected object may be mapped to a user interface control displayed by an application on a display screen.

In some implementations, the system 300 maps a position of a detected object to an interface displayed by the application being controlled. For example, the position of the detected object in a binary image may be mapped to a user interface displayed on a display screen. The position of the detected object may be mapped to a user interface control or graphic displayed on the user interface. For some user interface controls, such as a slider control, the position of the detected object may be mapped to a particular location on the user interface control. As another example, the position of the detected object may be mapped to the position of a cursor displayed on the user interface.

In these implementations, the system 300 may detect a gesture based on positions of a detected object with a series of images. For example, if the position of the detected object is mapped to a cursor position, a movement gesture may be detected within the series of images to detect movement of the cursor from a first position to a second position. As another example, a swipe gesture may be detected if multiple detected positions of the object within a series of images indicate a fast side-to-side horizontal movement of the object.

Other gestures may be detected if a multi-touch input is being used. For instance, the system 300 may detect multiple objects in the anticipated input region and determine an input based on a pattern of movement between the multiple objects (e.g., a user sliding fingers together or apart). Multi-touch input is described in more detail below.

The system 300 may determine user input based on the mapped position of the detected object and/or the detected gesture. For instance, in the example where the object is mapped to a cursor position and where a movement gesture is detected, a cursor movement user input may be determined. In the example where the mapped position of the detected object corresponds to an element displayed in the user interface displayed by the application being controlled, a command to select the user interface element may be determined.

The system 300 controls an application based on the determined user input (408). For example, the system 300 may control movement of a cursor is controlled based on the determined user input. In this example, the system 300 may map an object to a cursor position and detect a movement gesture. Based on the detected movement gesture, the system 300 may determine a cursor movement user input and then control movement of a cursor in a manner that corresponds to the detected movement gesture. For instance, the system 300 may detect a finger in a camera image captured by a camera at a first position and map the position of the finger to a first cursor position on a user interface displayed on a display screen. The system 300 detects movement of the finger within a series of camera images captured by the camera and determines a second position of the finger. The system 300 determines a cursor movement user input based on the detected movement gesture, and moves the position of the cursor from the first cursor position to a second cursor position in a direction and magnitude corresponding to the difference in the detected positions of the finger.

In another example, the system 300 may control a photo viewing application to display a different photo based on the determined user input. In this example, the system 300 may detect a swipe gesture, determine that the swipe gesture corresponds to a "next-photo" user input, and replace a displayed photo with a new photo based on the determination that the swipe gesture corresponds to a "next-photo" user input.

In some implementations, the system 300 controls a game based on the determined user input. In these implementations, the system 300 may detect touch events as the user input and control the game based on the touch events. For example, the game may be responsive to a touch event based on a display provided by the game when the touch event is detected. In this example, the system 300 may control the game by comparing the position of the touch event on the display screen to an image displayed on the display screen when the touch event was detected.

An application or system without a corresponding display screen may be controlled based on the determined user input. For example, the user input may be a "change station" user input determined based on a recognized swipe gesture performed in front of a car radio player and the car radio player may be controlled to change to a next station in a list of defined stations. As another example, the user input may be a "summon elevator" user input determined based on an object (e.g., hand) detected in front of an elevator door, and an elevator system may be controlled to transfer an elevator from another floor to the floor where the elevator door is located. As yet another example, the user input may be an "open door" user input based on a detected object (e.g., person) in front of a doorway, and a door may be opened in response to the user input.

FIGS. 5 to 13 illustrate example implementations where near hover user input is detected (e.g., hovering zero to one inch in front of a thirty-two inch screen). FIG. 1 also illustrates an example implementation that may be used to detect a near hover user input.

Basic Configuration

Figure 5:
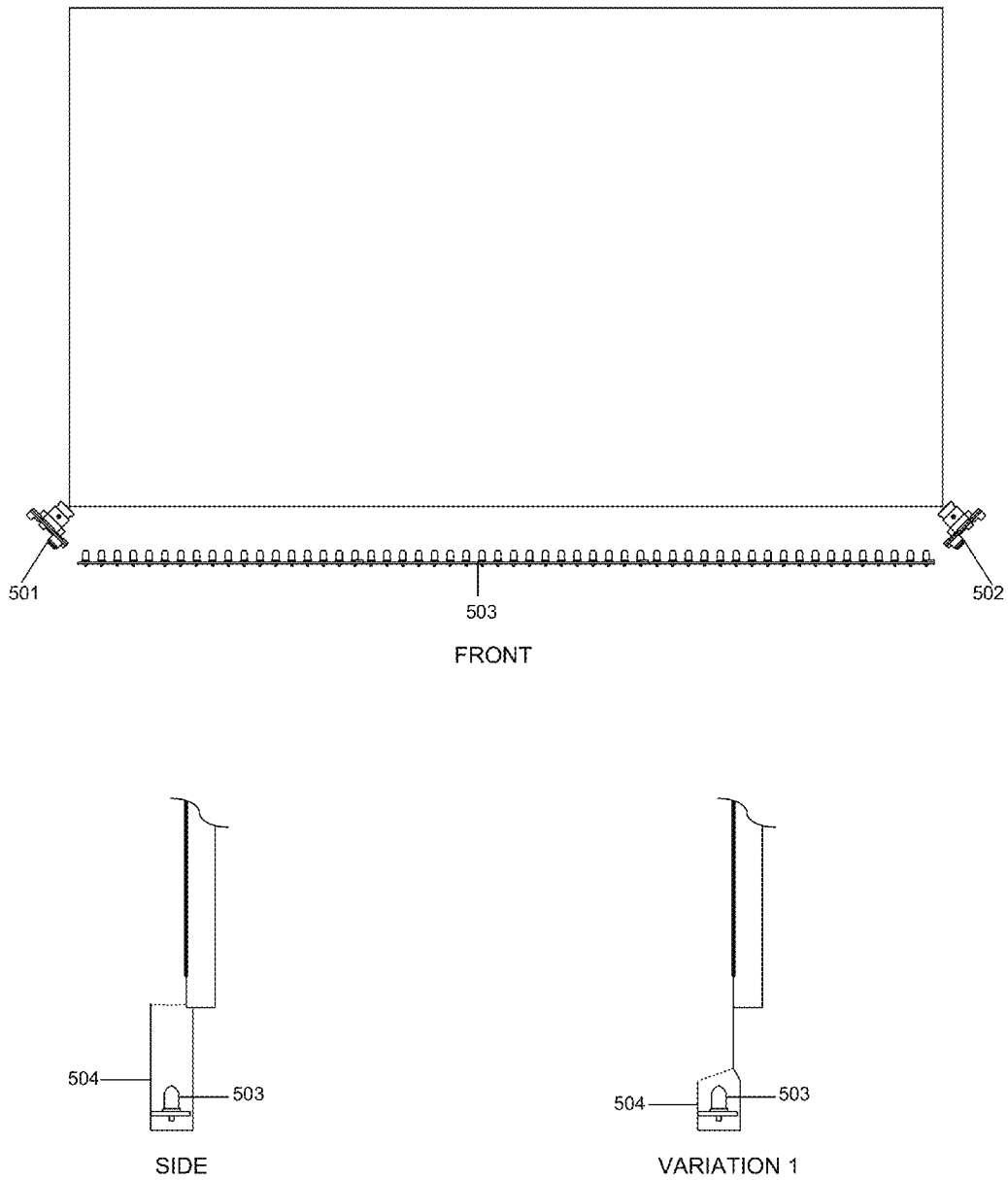
FIG. 5 illustrates an apparatus including two infra-red sensitive cameras and positioned at the bottom corners of a display screen, and a single infra-red emitter strip positioned between the cameras.

FIG. 5 illustrates an apparatus including two infra-red sensitive cameras 501 and 502 positioned at the bottom corners of a display screen, and a single infra-red emitter strip 503 positioned between the cameras. The emitter strip 503 is embedded approximately one inch below the bottom edge of the screen, and embedded into the screen's bezel 504.

Figure 6:
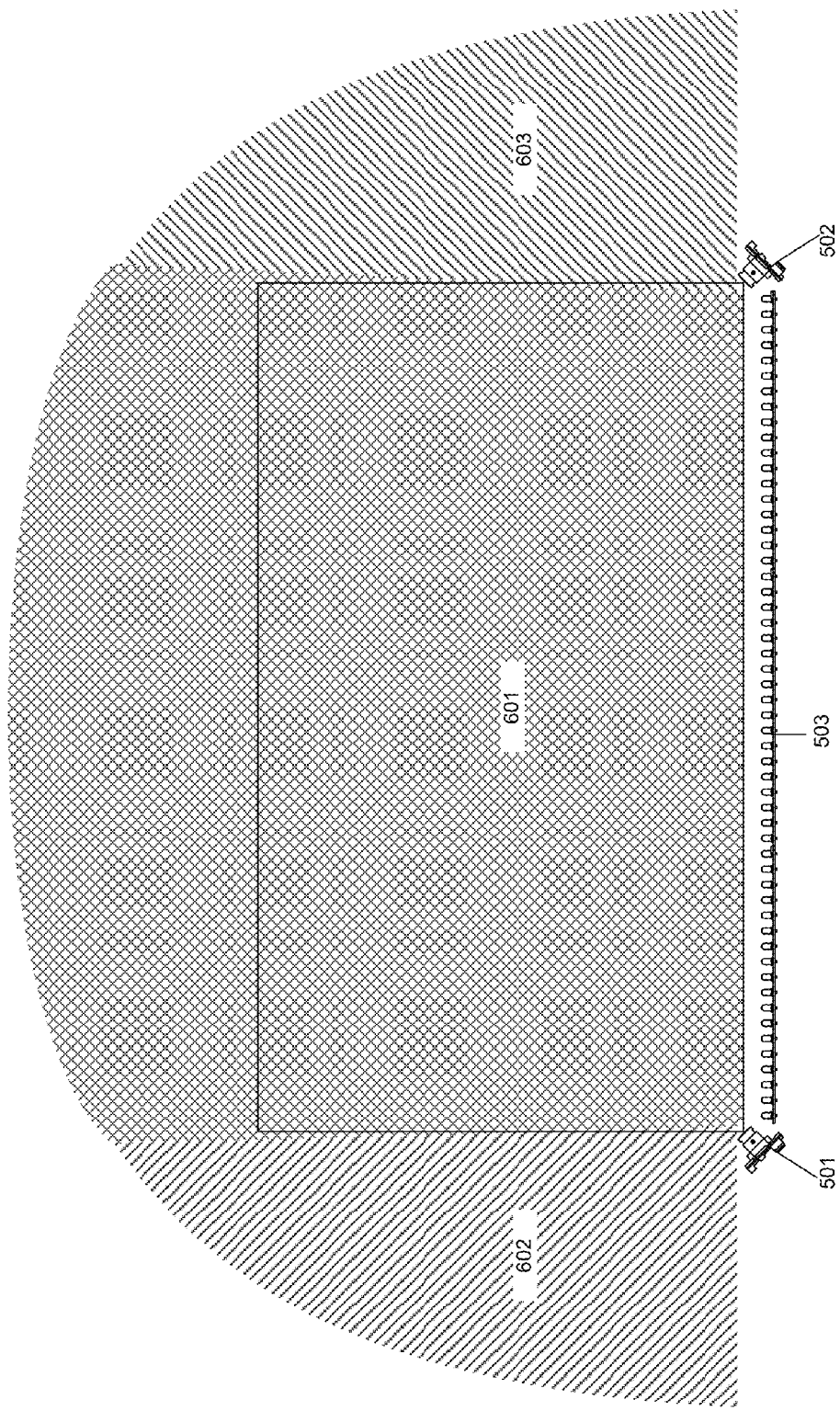
FIG. 6 illustrates the intersection region of the field-of-views of both cameras and the illumination region of the emitters in the emitter strip.

FIG. 6 illustrates the intersection region 601 of the field-of-views of both cameras 501 and 502 and the illumination region of the emitters in the emitter strip 503. Objects to the left of the screen within area 602 exclusive of area 601, are within the field-of-view of camera 502, but are not illuminated, and therefore may be ignored by subtracting an illuminated camera image from an ambient camera image. Likewise, objects to the right of the screen within area 603 exclusive of area 601, are within the field-of-view of camera 501, but are not illuminated, and also may be ignored by subtracting an illuminated camera image from an ambient camera image. Therefore, people or objects to the sides of the screen may be ignored and objects in front of the screen may be detected. The cameras 501 and 502 and the emitter strip 503 may be used in the implementation shown in FIG. 1 and touch inputs may be detected based on an object being detected in the intersection region 601 using techniques described throughout this disclosure.

Figure 7:
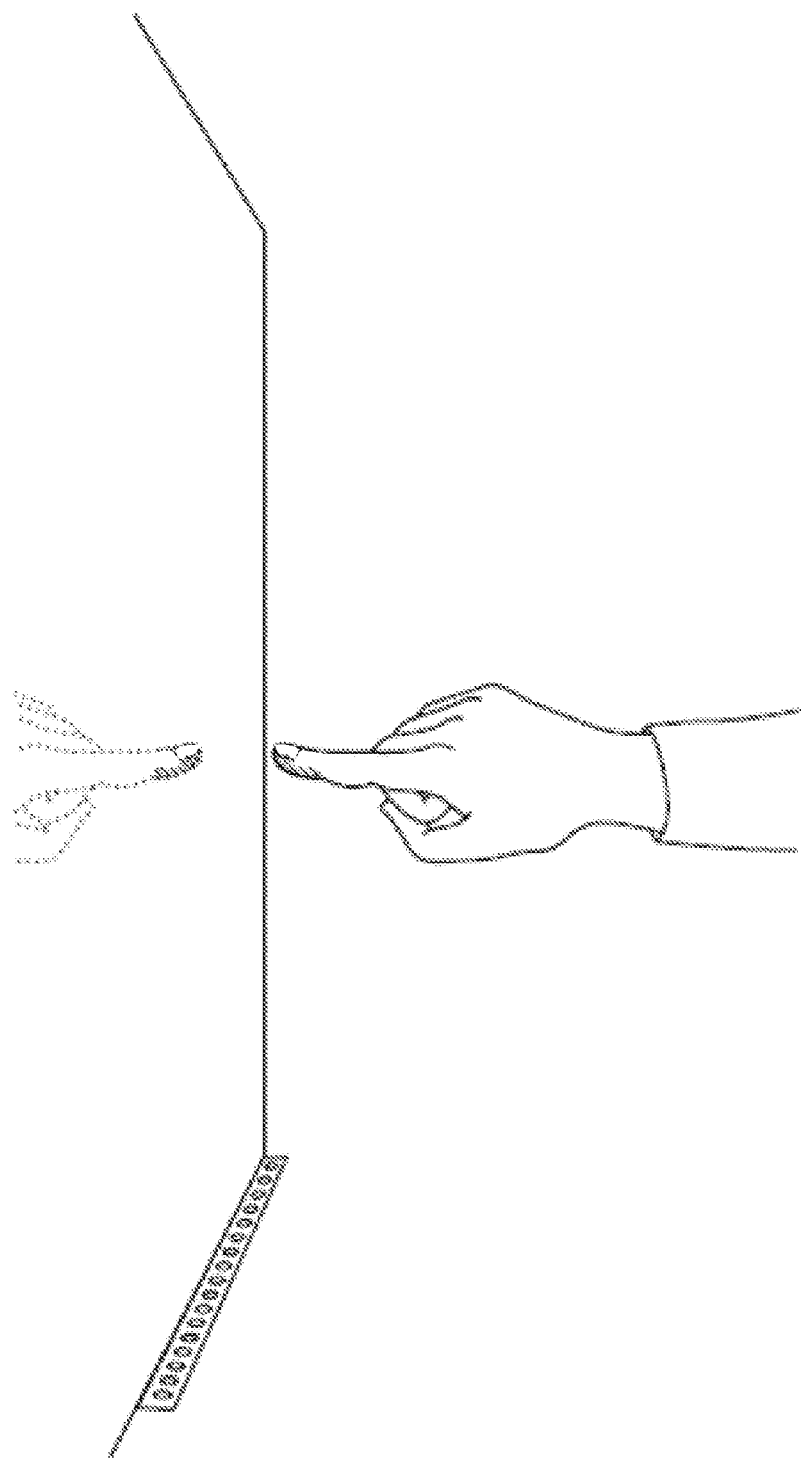
FIG. 7 illustrates a sample camera image of a finger hovering approximately one inch from the screen.

FIG. 7 illustrates a sample camera image of a finger hovering approximately one inch from the screen. The fingertip is illuminated. Part of the ceiling also is illuminated, however this may be filtered out using background modeling because it is stationary. The ceiling may pose a problem if the screen wobbles when touched. As shown in FIG. 7, significant blooming around the LEDs exists. The LEDs may be recessed approximately one inch beyond the bottom edge of the screen so that the blooming does not enter the tracking region.

In order to model the background above the screen, the illumination and camera sequence for this configuration may use two phases: (1) A first phase without illumination, and (2) A second phase with illumination.

Summary of Basic Configuration Example

Minimal number of LEDs.

Best frame-rate.

Not distracted by people or objects below or to the sides of the screen.

Existing tracking with known characteristics.

May not be able to detect a fingertip hovering near the bottom edge of the screen.

May be distracted by people or objects moving above the screen.

May be distracted if the screen wobbles when touched.

Variation 1

In some examples, the shape of the bezel is modified as shown in FIG. 5 VARIATION 1. The variation allows for a wider angle LED, which increases the LED power requirements and reduces a part of an anticipated input region where a finger is not detected. For instance, touch inputs at a bottom of the screen may be more easily detected when the VARIATION 1 bezel and wider angle LED are used. When applied to the implementation shown in FIG. 1, the part 105 of the anticipated input region that is not covered by the intersection of the field of view of the camera 101 and the light emitted from the illumination source 102 may be reduced.

In these examples, to reduce a likelihood (e.g., prevent) the user's body from being detected, the field of view of the cameras may remain narrow. Therefore, the part 105 where the finger is not detected only occurs at the bottom left and bottom right corners of the screen, instead of across the entire screen.

Summary Variation 1

Minimal number of LEDs.

Best frame-rate.

Not distracted by people or objects below or to the sides of the screen.

Existing tracking with known characteristics.

Smallest area near the bottom corners of the screen where a hovering fingertip may not be detected.

May be distracted by people or objects moving above the screen.

May be distracted if the screen wobbles when touched.

Unusual shaped bezel to accommodate LEDs.

Variation 2

Figure 8:
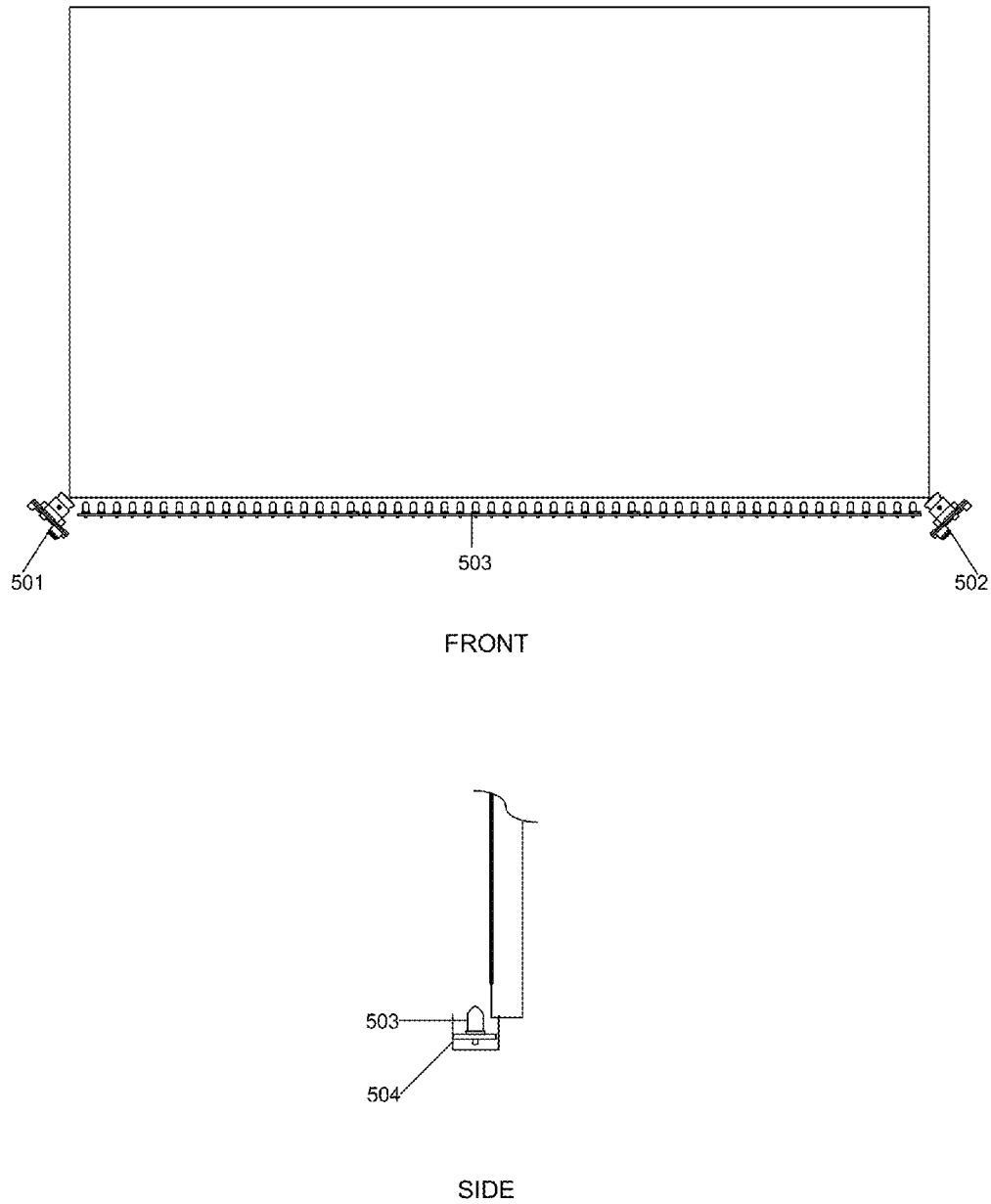
FIG. 8 illustrates the part where a finger is not detected that may be lessened by using wider-angle LEDs and bringing them closer to the screen.

The part 105 where a finger is not detected may be lessened by using wider-angle LEDs and bringing them closer to the screen, as illustrated in FIG. 8. However, this may increase blooming and increase the LED power requirements. To get around the problem of blooming, a third phase may be added where the LEDs emit light at a reduced power level, allowing the camera to detect the finger in the area that is otherwise covered by blooming. The camera may not be able to track the entire screen area when the light output is reduced, so the second phase where the LEDs are full powered may be used to detect touch inputs at a top of the screen that is relatively far from the LEDs. Using three phases reduces the tracking frame rate to a third of the camera frame rate. Alternative to reducing the power level of the LEDs, the exposure time of the camera may be reduced.

Figure 9A:
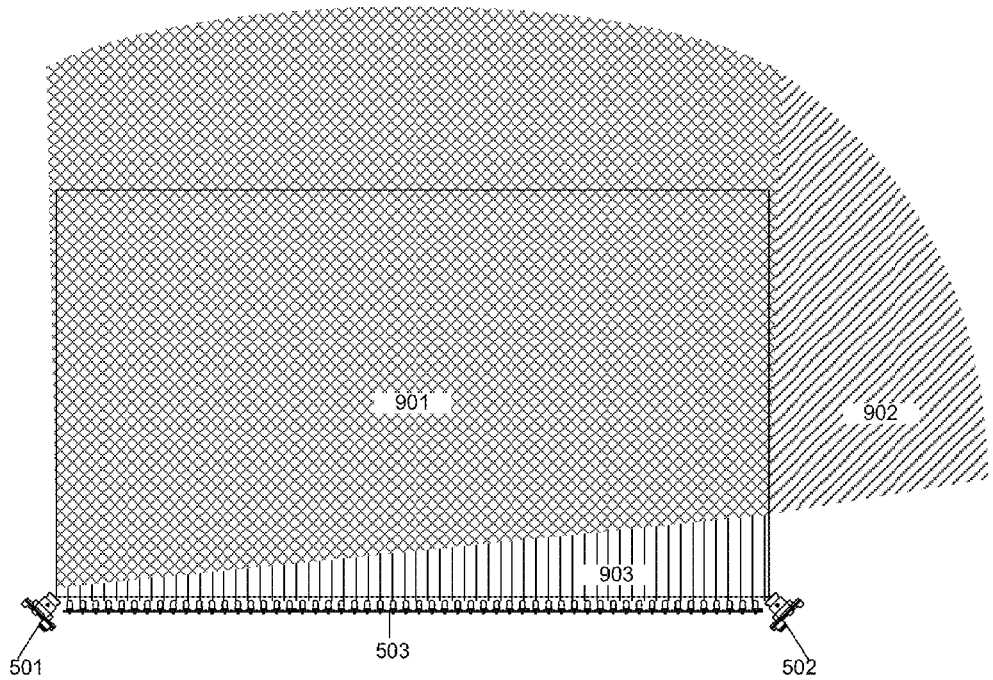
FIG. 9A illustrates the intersection region of the field-of-view of camera, and the illumination region of the emitters, during the second phase where the LEDs are illuminated.

FIG. 9A illustrates the intersection region 901 of the field-of-view 902 of camera 501, and the illumination region 903 of the emitters 503, during the second phase where the LEDs are illuminated. The field of view 902 of the camera avoids the area covered by blooming. Therefore, the intersection region 901 does not include the entire screen.

Figure 9B:
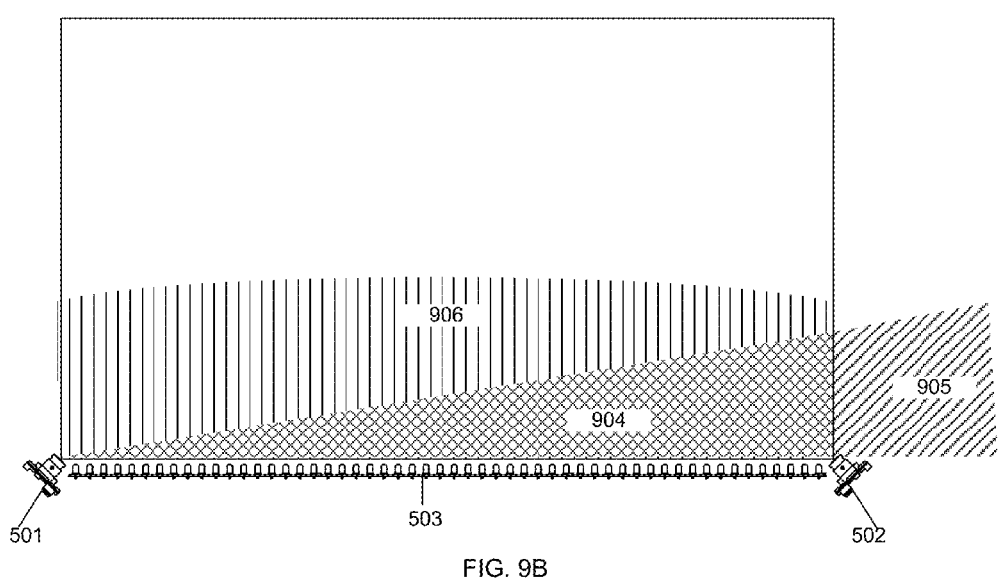
FIG. 9B illustrates the intersection region of the field-of-view of camera and the illumination region of the emitters, during the third phase where the LEDs are illuminated at a reduced intensity.

FIG. 9B illustrates the intersection region 904 of the field-of-view 905 of camera 501 and the illumination region 906 of the emitters 503, during the third phase where the LEDs are illuminated at a reduced intensity. The intensity may be too low to detect the finger more than a few inches above the LEDs. However, by analyzing images captured during the second phase and the third phase together, fingers may be detected over the entire display screen and the impact caused by blooming of the emitters 503 may be reduced.

The intersection region of the field-of-view of camera 502 and the illumination region of the emitters 503 is a mirror image of that shown in FIG. 9A and FIG. 9B for camera 501.

Figure 10:
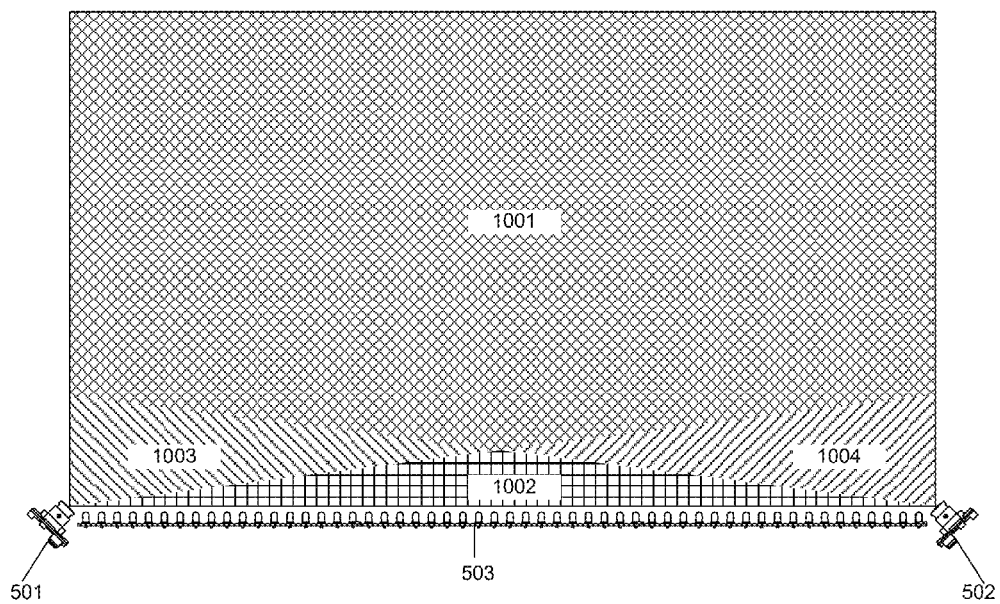
FIG. 10 illustrates how the finger may be detected in all parts of the screen, in one or a combination of phases.

The finger may be detected in all parts of the screen, in one or a combination of phases as illustrated in FIG. 10:

In the upper part of the screen 1001, during the second phase of both cameras.

In the lower-center part of the screen 1002, during the third phase of both cameras.

In the lower-left part of the screen 1003, during the second phase of camera 501 and the third phase of camera 502.

In the lower-right part of the screen 1004, during the third phase of camera 501 and the second phase of camera 502.

Summary of Variation 2
Minimal number of LEDs.
Minimal bezel size, and normal shaped bezel.
Not distracted by people or objects below or to the sides of the screen.
Smaller area near the bottom of the screen where a hovering finger-tip may not be detected.
Reduced frame-rate.
May be distracted by people or objects moving above the screen.
May be distracted if the screen wobbles when touched.

Variation 3

Figure 11:
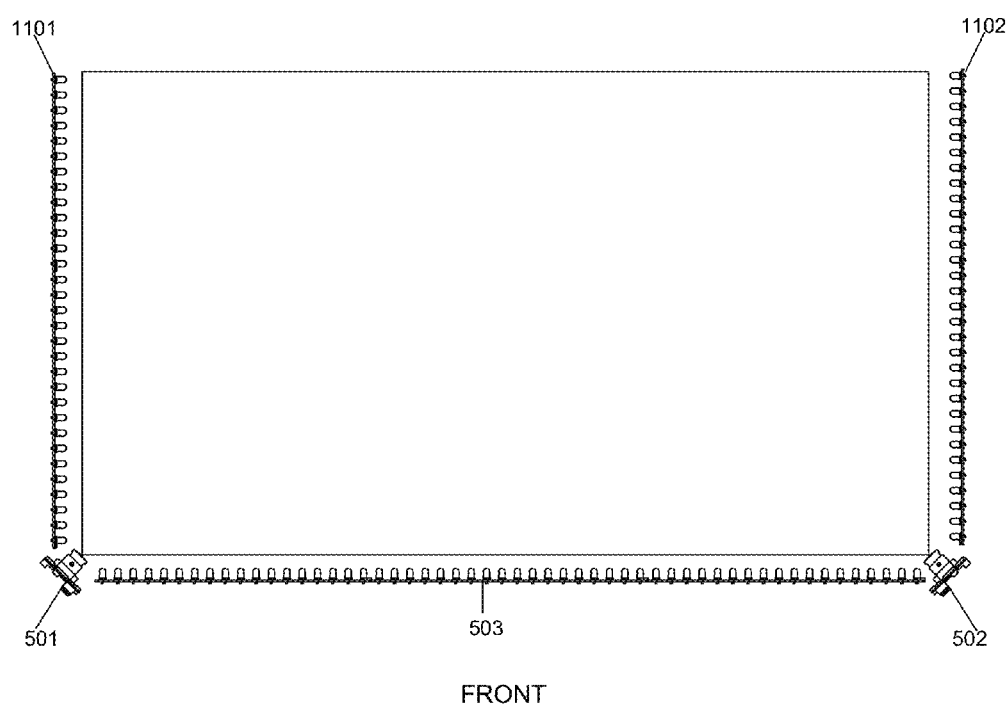
FIG. 11 illustrates the problems where tracking may be distracted by people or object moving above the screen or if the screen wobbles may be addressed by the addition of infrared emitter strips and along the sides of the screen.

The problems where tracking may be distracted by people or object moving above the screen or if the screen wobbles may be addressed by the addition of infrared emitter strips 1101 and 1102 along the sides of the screen as shown in FIG. 11. The infrared emitter strips 1101 and 1102 are positioned similar to the emitter strip 503, but at sides of the display screen instead of the bottom. Accordingly, the infrared emitter strips 1101 and 1102 emit infrared light over the surface of the display screen in a manner where the illumination extends about one inch from the surface of the display screen. Because the infrared emitter strips 1101 and 1102 emit infrared light in a different direction than the emitter strip 503, the infrared emitter strips 1101 and 1102 define different intersection regions with the field of view of the cameras 501 and 502.

Figure 12A:
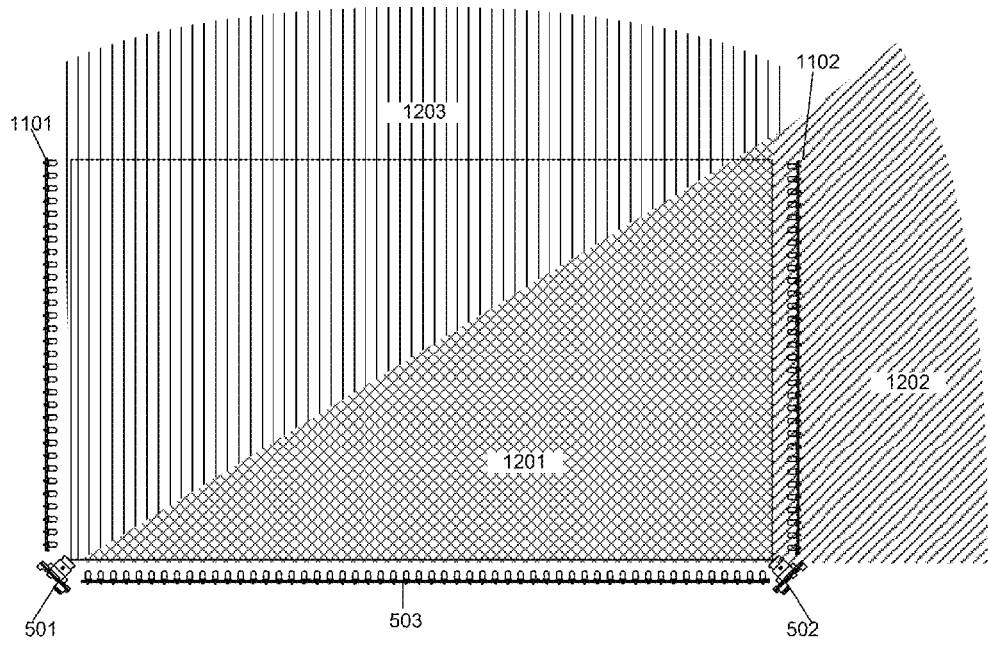
FIG. 12A illustrates the intersection region of the field-of-view of camera, and the illumination region of the emitters, during the second phase where only the emitters are illuminated.

FIG. 12A illustrates the intersection region 1201 of the field-of-view 502 of camera 501, and the illumination region 1203 of the emitters 503, during the second phase where only the emitters 503 are illuminated. The field of view 1202 of the camera avoids the area above the top of the screen that is illuminated by the emitters 503. Therefore, the intersection region 1201 does not include the entire screen.

Figure 12B:
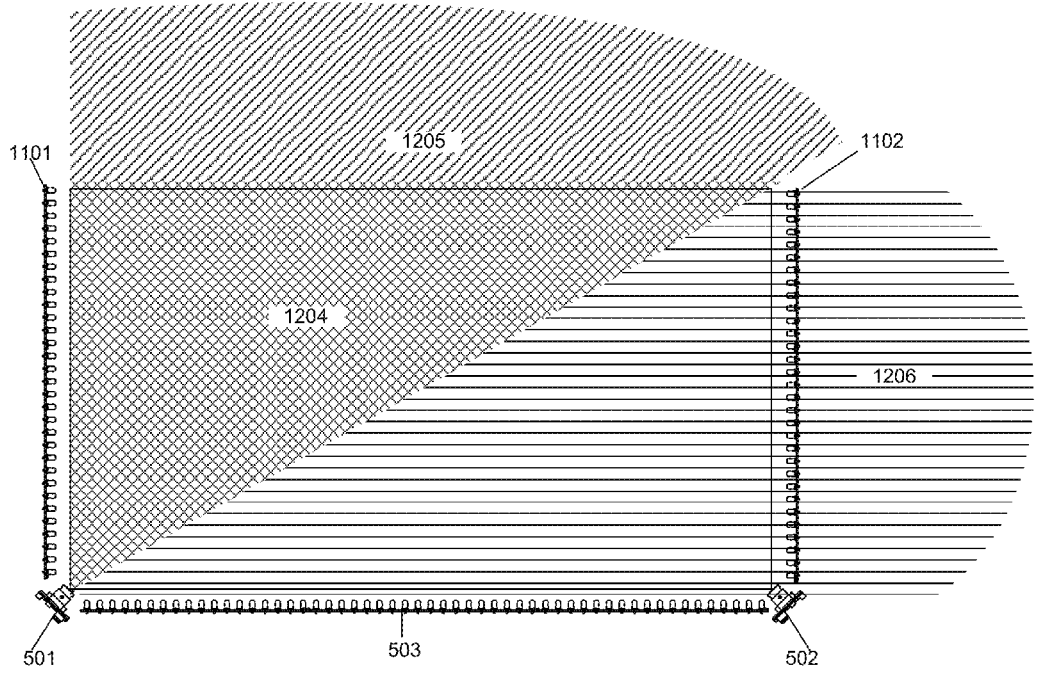
FIG. 12B illustrates the intersection region of the field-of-view of camera and the illumination region of the emitters, during a fourth phase where only the emitters are illuminated.

FIG. 12B illustrates the intersection region 1204 of the field-of-view 1205 of camera 501 and the illumination region 1206 of the emitters 1101, during a fourth phase where only the emitters 1101 are illuminated. The field of view 1205 of the camera avoids the area to the side of the screen that is illuminated by the emitters 1101. Therefore, the intersection region 1204 does not include the entire screen, but the combination of intersection regions 1201 and 1204 covers the entire screen.

Figure 13:
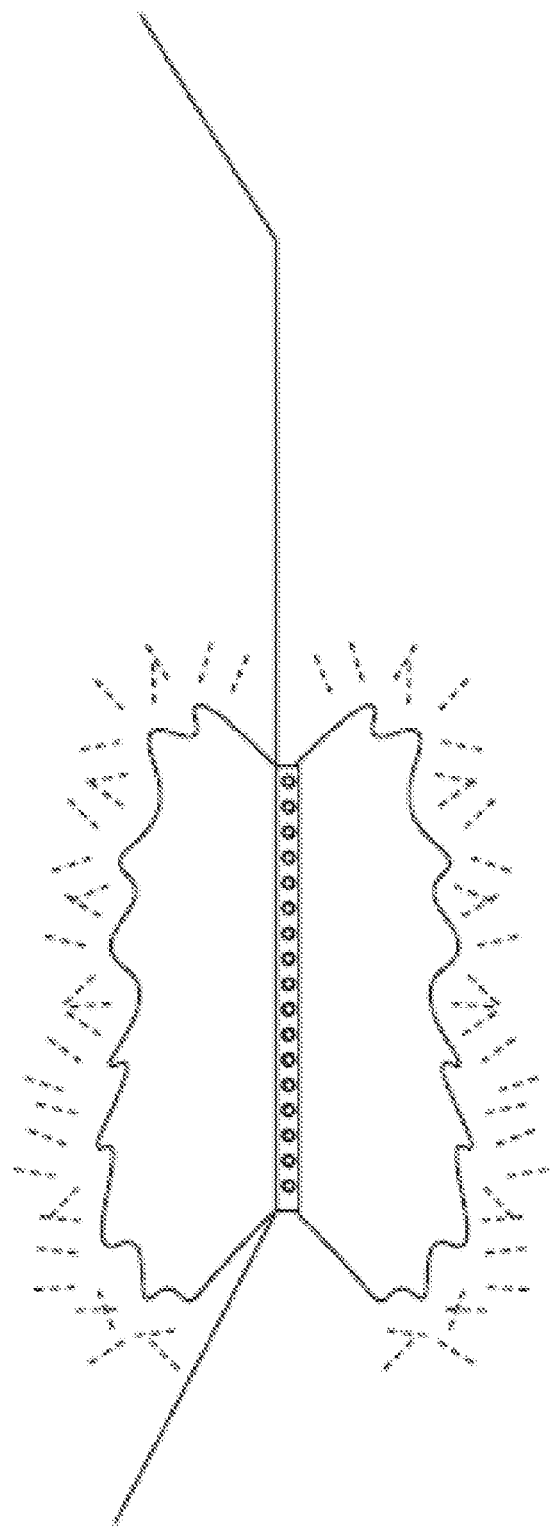
FIG. 13 shows that there is excessive blooming near the LEDs when the emitters are emitting light as viewed by the camera.

FIG. 13 shows that there is excessive blooming near the LEDs when emitter 1101 and 1102 are emitting light as viewed by camera 501. Therefore, emitters 1101 and 1102 may not be lit at the same time, requiring a fifth phase for camera 502 and emitter 1102. The intersection region of the field-of-view of camera 502 and the illumination region of the emitters 503 and 1102 are a mirror image of that shown in FIG. 12A and FIG. 12B for camera 501.

Since it is possible to exclude the area above the screen, a first phase where no LEDs are illuminated may not be used. Therefore, a total of three phases (phase two, four, and five) may be used. A combination of analyzing images captured during the second phase where only the emitters 503 are illuminated at full strength, images captured during the fourth phase where only the emitters 1101 are illuminated at full strength, and images captured during the fifth phase where only the emitters 1102 are illuminated at full strength may be used to detect touch events over the entire display screen while ignoring objects outside (e.g., above or at the sides) of the display screen.

Summary of Variation 3
Larger number of LEDs.
Not distracted by people or objects on any side of the screen, not even the top.
Not distracted if the screen wobbles when touched.
Reduced frame-rate.
May not detect a fingertip hovering near the bottom edge of the screen.

Combination of Variations

Variations 1 and 3 may be combined to minimize the part 105 where a finger is not detected, and eliminate problems where tracking may be distracted by people or objects moving above the screen or if the screen wobbles. This solution may use a total of three phases (phase two, four, and five), and provides tracking.

Variations 2 and 3 may be combined to reduce the part 105 where a finger is not detected, and eliminate problems where tracking may be distracted by people or objects moving above the screen or if the screen wobbles. This solution may use a total of four phases (phase two, three, four, and five), and therefore the overall tracking frame rate is reduced further.

Figure 14:
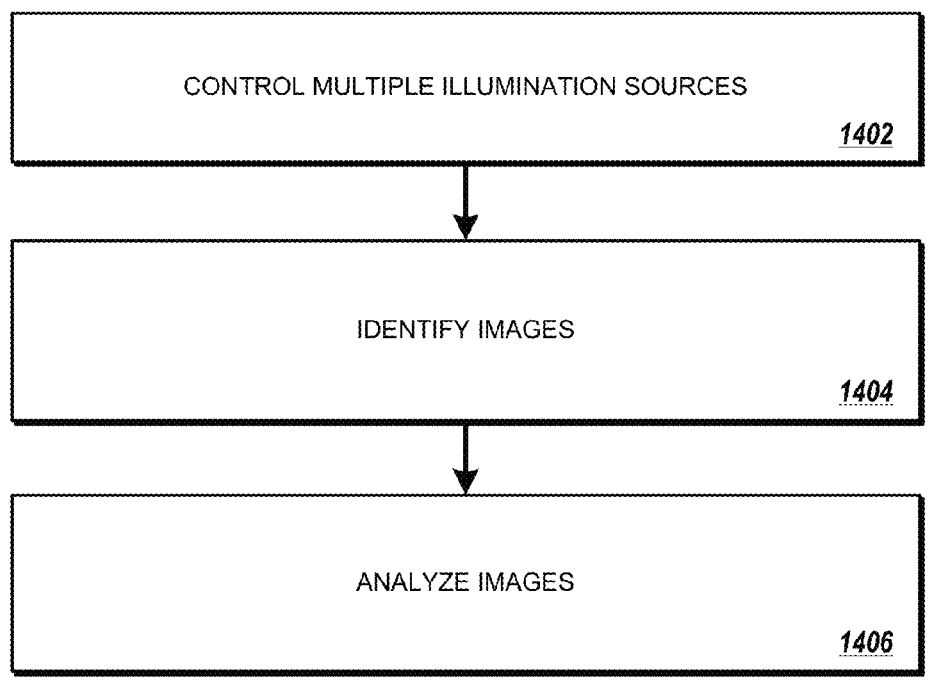
FIG. 14 illustrates a process for determining a position of an object where multiple illumination sources are used.

FIG. 14 illustrates a process 1400 for determining a position of an object where multiple illumination sources are used. The operations of the process 1400 are described generally as being performed by the system 300. The operations of the process 1400 may be performed exclusively by the system 300, may be performed exclusively by another system, or may be performed by a combination of the system 300 and another system. In some implementations, operations of the process 1400 may be performed by one or more processors included in one or more electronic devices.

The system 300 controls multiple illumination sources to illuminate in sequence with images captured by a camera in an alternating pattern (1402). For example, multiple illumination sources may be positioned at an opposite side of a display screen from a camera. Each illumination source may be positioned at a different angle to illuminate a different illuminated area in front of the display screen. For example, FIGS. 15A-C illustrate various illumination source configurations. FIG. 15A illustrates a system 1510 in which an illumination source 1512 is positioned to produce an illuminated area 1514 in front of a display screen 1516. An intersection region 1518 is formed by the intersection of the illuminated area 1514 and a wide-angle field-of-view 1520 of a camera 1522. Most of the area of the intersection region 1518 is located near the top of the display screen 1516.

FIG. 15B illustrates a system 1530 in which an illumination source 1532 is positioned to produce an illuminated area 1534 angled further away from a display screen 1536 (e.g., as compared to the distance between the illuminated area 1514 and the display screen 1516). An intersection region 1538 located near the center of the display screen 1536 is formed by the intersection of the illuminated area 1534 and a medium-angle field-of-view 1540 of a camera 1522. As another example, FIG. 15C illustrates a system 1550 in which an illumination source 1552 is positioned to produce an illuminated area 1554 angled even further away from a display screen 1556 (e.g., as compared to the distance between the illuminated area 1514 and the display screen 1516). An intersection region 1558 located near the bottom of the display screen 1556 is formed by the intersection of the illuminated area 1554 and a narrow-angle field-of-view 1560 of a camera 1562.

Figure 15:
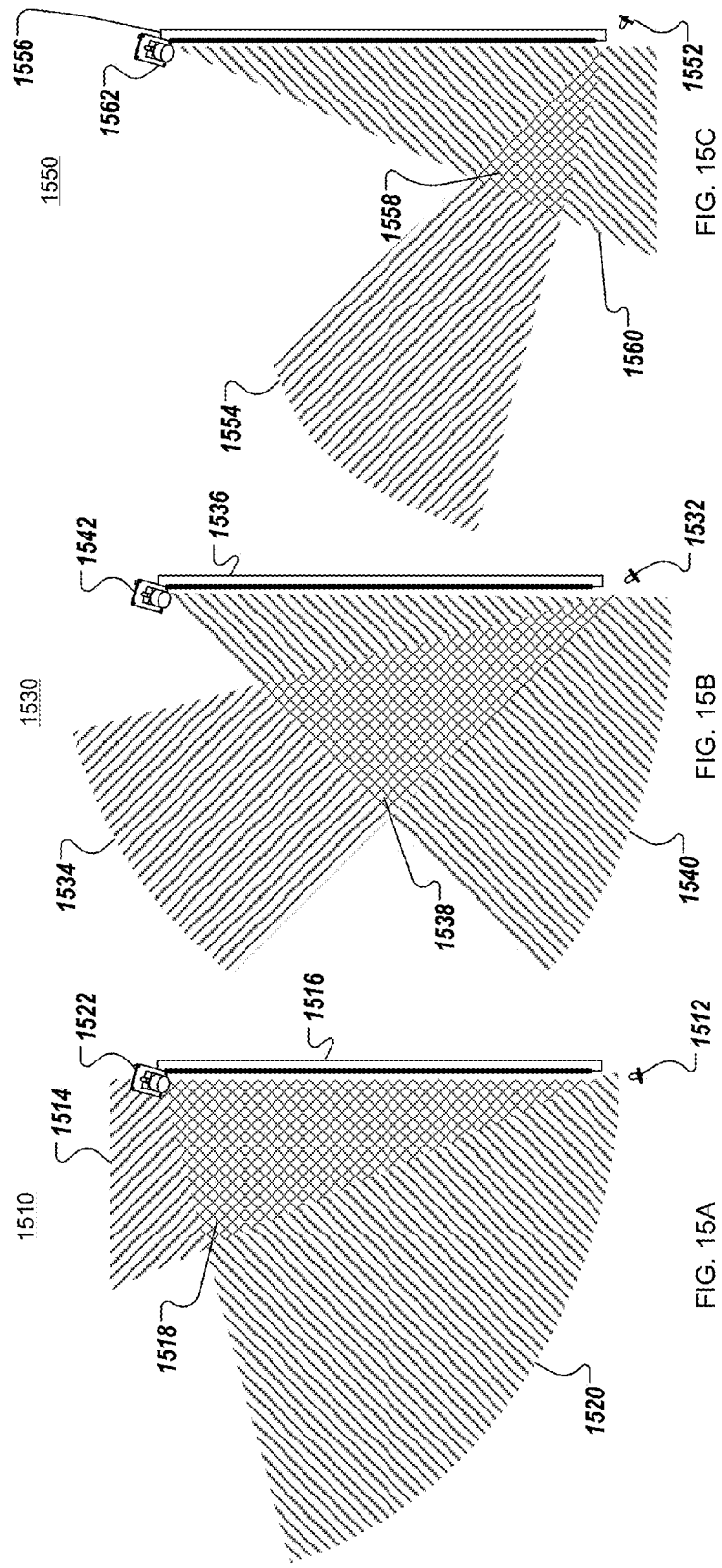
FIG. 15A illustrates a system in which an illumination source is positioned to produce an illuminated area in front of a display screen.
FIG. 15B illustrates a system in which an illumination source is positioned to produce an illuminated area angled further away from a display screen (e.g., as compared to the distance between the illuminated area and the display screen).
FIG. 15C illustrates a system in which an illumination source is positioned to produce an illuminated area angled even further away from a display screen (e.g., as compared to the distance between the illuminated area and the display screen).
Figure 16:
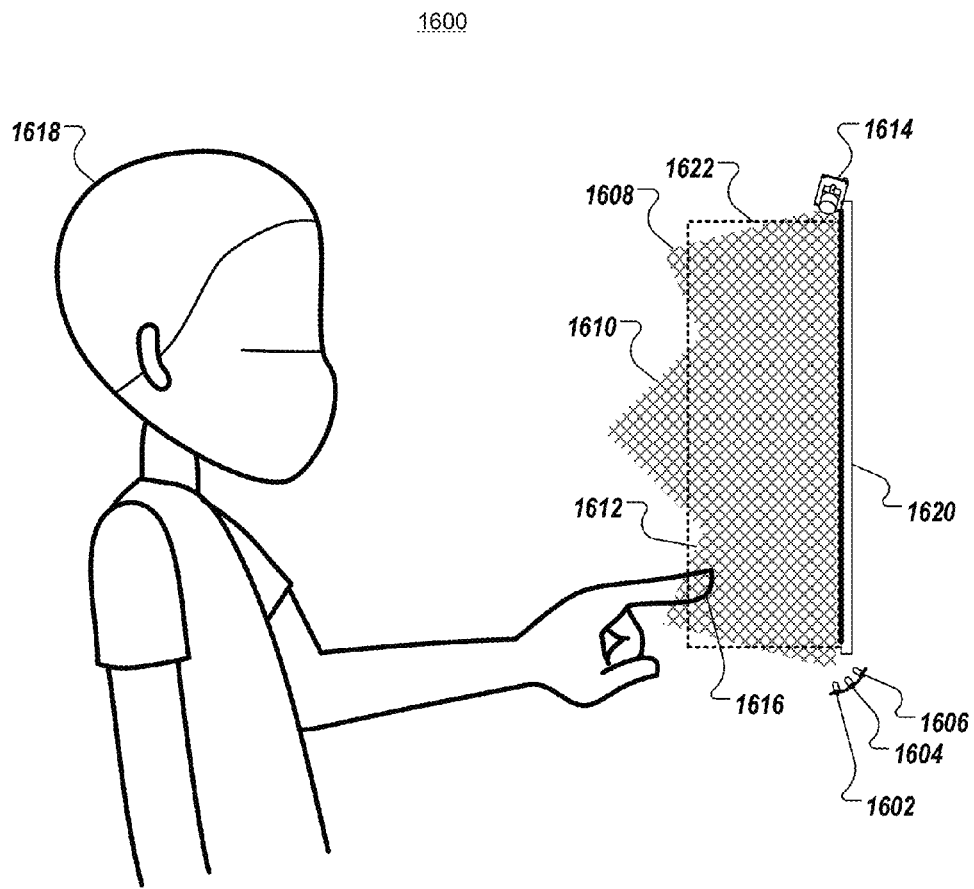
FIG. 16 illustrates a system which includes multiple illumination sources.

FIG. 16 illustrates a system 1600 which includes multiple illumination sources. The system 1600 includes illumination sources 1602-1606 producing illuminated areas 1608-1610, respectively. The illumination sources 1602-1606 may correspond, for example, to illumination sources 1512, 1532, and 1552, respectively, and the illuminated areas 1608-1612 may correspond to illuminated areas 1514, 1534, and 1554, respectively (e.g., as described above with respect to FIGS. 15A-C). The illumination sources 1602-1606 may be controlled to illuminate, one at a time, in sequence with images captured by a camera 1614. For example, the illumination source 1602 may be controlled to illuminate the illuminated area 1608 while the camera 1614 captures a first camera image, the illumination source 1604 may be controlled to illuminate the illuminated area 1610 while the camera 1614 captures a second camera image, and the illumination source 1606 may be controlled to illuminate the illuminated area 1612 while the camera 1614 captures a third camera image. The camera 1614 also may capture an image when none of the illumination sources 1602-1606 are illuminated. In addition, multiple cameras may be controlled to capture images in sequence with the illumination of the illumination sources 1602-1606.

Returning to FIG. 14, for each of the multiple illumination sources, the system 300 identifies an image captured when the corresponding illumination source was illuminated and the other illumination sources were not (1404). For example and as shown in FIG. 16, a first camera image may be identified which corresponds to when the illumination source 1602 was illuminated, a second camera image may be identified which corresponds to when the illumination source 1604 was illuminated, and a third camera image may be identified which corresponds to when the illumination source 1606 was illuminated.

Returning to FIG. 14, the system 300 analyzes each of the identified images in combination to determine an enhanced position of an object within an anticipated input region defined by the multiple illumination sources (1406). For instance, in the example of FIG. 16, a finger 1616 of a user 1618 reaching towards the bottom of a display screen 1620 may be detected in a camera image captured when the illumination source 1606 is illuminated. If the user reaches farther forward, closer to the display screen 1620, the finger 1616 may be detected when either the illumination source 1604 or the illumination source 1602 is illuminated.

An approximately rectangular anticipated input region 1622 is formed by the combination of the intersection of the illuminated areas 1608-1612 and one or more field-of-views of the camera 1614. That is, the overlapping of the intersection of the illuminated area 1612 and a field-of-view of the camera 1614 with the intersection of the illuminated area 1610 and a field-of-view of the camera 1614 with the intersection of the illuminated area 1608 and a field-of-view of the camera 1614 nearly fills the rectangular area 1622. The use of illuminators 1602-1606 to form the rectangular anticipated input region 1622 allows for an object (e.g., the finger 1616) to be detected at close to a constant distance (e.g., six inches) from the display 1620. Additionally, the use of multiple illuminators 1602-1606 allows for a depth detection of the finger 1616 (e.g., distance from the display screen 1620), as well as for detection of a horizontal and vertical position of the finger 1616.

This configuration may be used in relatively far hover implementations capable of detecting an object (e.g., a finger) at distance of one to six inches in front of a thirty-two inch display screen. FIG. 2 also illustrates an example implementation that may be used to detect a far hover user input.

Figure 17:
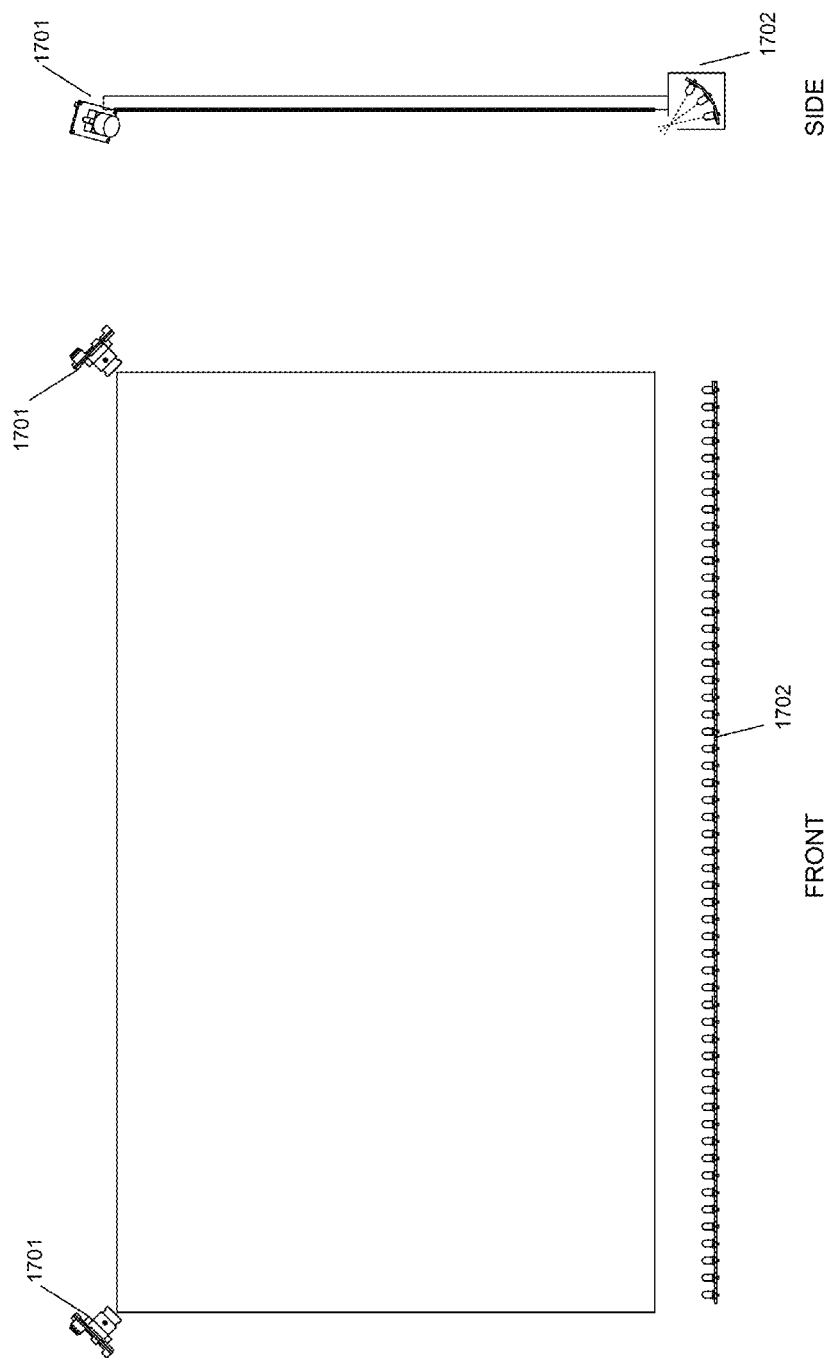
FIG. 17 illustrates an apparatus capable of detecting a fingertip hovering in front of a display screen.

FIG. 17 illustrates an apparatus capable of detecting a fingertip hovering in front of a display screen. The apparatus includes infra-red sensitive cameras 1701 positioned at opposite upper corners of the display screen and infrared emitters 1702 positioned at a lower edge or side of the display screen.

The apparatus shown in FIG. 17 may use three phases of illumination, similar to those shown in FIG. 15 and FIG. 16. In a first phase, a first emitter produces an illumination region near the screen that, when combined with a wide-angle camera field-of-view, produces an intersection region towards the area near the top of the screen. In a second phase, a second emitter produces an illumination region angled further away from the screen that, when combined with a medium-angle camera field-of-view, produces an intersection region over the center of the screen. In phase a third phase, a third emitter produces an illumination region angled even further away from the screen that, when combined with a narrow-angle camera field-of-view, produces an intersection region towards the bottom of the screen.

Based on the three phases of illumination, the apparatus shown in FIG. 17 defines a combined intersection region of the three phases, which is illustrated in FIG. 16. The combined intersection region approximates the rectangular anticipated input region (e.g., the rectangular target hover detection region). The anticipated input region (e.g., the target hover detection region) is positioned to exclude the user's body when the user is viewing the screen from a typical viewing position. The user's fingertip may be detected in almost all parts of the anticipated input region (e.g., the target hover detection region).

Figure 18:
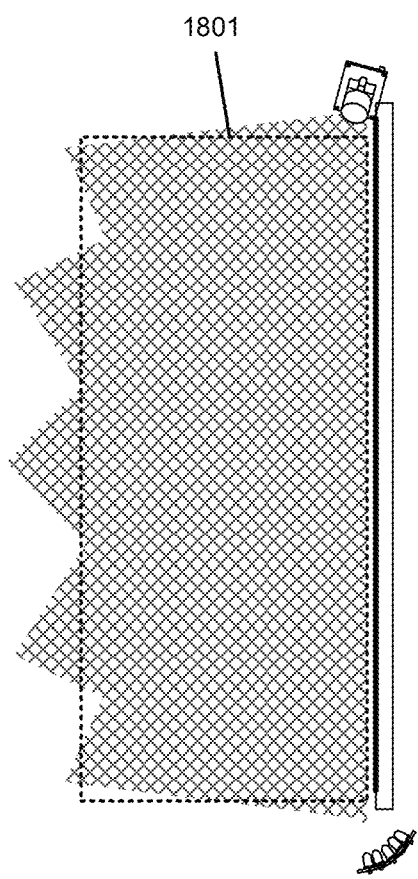
FIG. 18 illustrates a combined intersection region of five phases of illumination with five angled emitters with different angles relative to the display screen and the cameras.

FIG. 18 illustrates a combined intersection region of five phases of illumination with five angled emitters with different angles relative to the display screen and the cameras. The combined intersection region more closely approximates the rectangular anticipated input region (e.g., the rectangular target hover detection region) 1801 because the number of phases is increased. However, because the number of phases is increased, the frame rate is lowered, which may result in slower responsive in detecting touch inputs.

The configuration illustrated in FIGS. 15-17 uses three emitter strips and two cameras. Software may crop the camera images to operate using a unique region-of-interest of the camera images to replicate the corresponding three field-of-views using a single pair of cameras. However, a separate camera image is captured for each phase of illumination. A fourth camera image may be captured without any active illumination, in order to model and subtract background illumination.

The system may detect a fingertip hovering approximately one to six inches above a thirty-two inch diagonal screen. Selection of the angles of the cameras and the illumination sources may be designed to cover a desired anticipated input region (e.g., a rectangular region one to six inches from the surface of the display screen). It may not be possible to detect a fingertip within one inch of the screen, because the cameras are pointing directly at the LEDs, and the LEDs tend to bloom within the camera image. The system may be combined with other tracking techniques in order to track the fingertip on the screen or hovering within one inch of the screen, such as those techniques described above with respect to detecting relatively near hover user input.

The three emitters may be embedded into the same side of the screen's bezel. Although this may limit how small the bezel may be manufactured, the three emitters may be hidden from view.

A sequence of four camera images may be captured in order to cover the entire hover detection region and subtract background illumination, limiting the effective rate of tracking to one-quarter the camera's frame rate. Given the speed of image capture and processing, the system may still be able to track and detect user input at a suitable speed for an acceptable level of responsiveness.

In some implementations, the systems described throughout this disclosure may be used to determine multi-touch user input. Multi-touch involves detecting and tracking the positions of two, three, or four fingers or styli that touch a screen. Although illumination sources may be used to define anticipated input regions to enhance user input detection, illumination sources are not required and the multi-touch techniques described throughout this disclosure may be applied independently of systems that use anticipated input regions.

Figure 19:
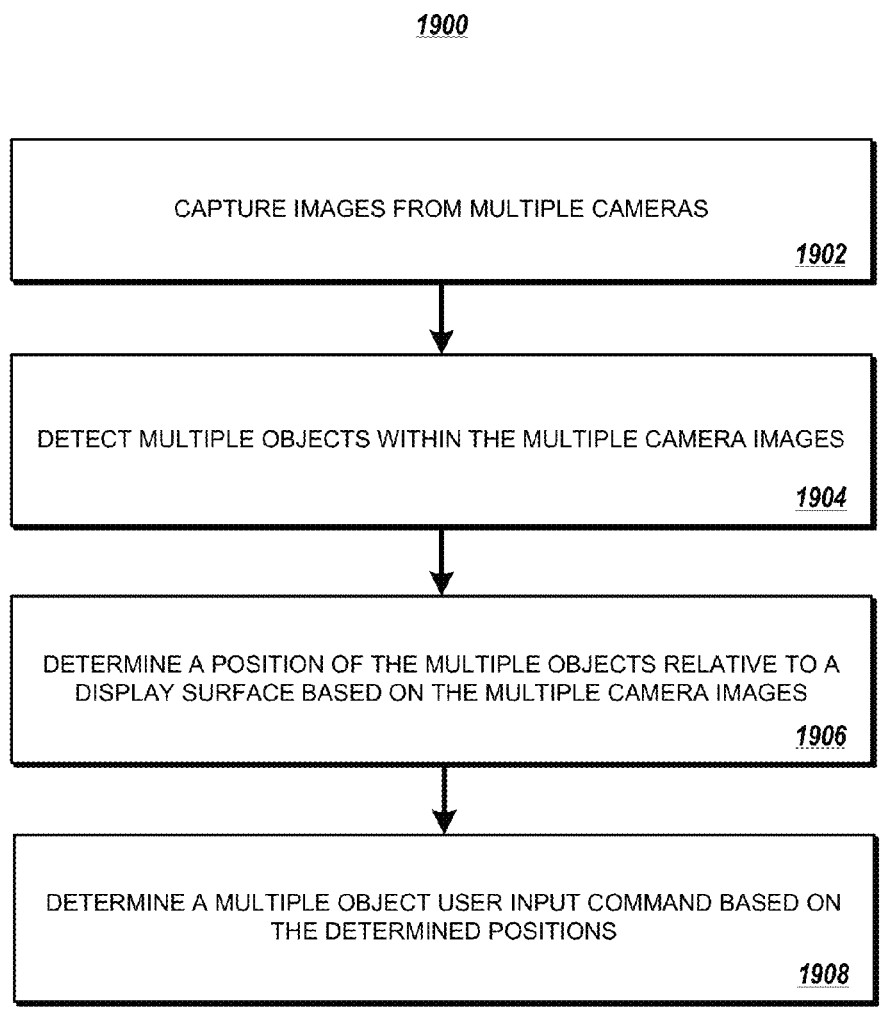
FIG. 19 illustrates a process for determining a multiple object user input command.

FIG. 19 illustrates a process 1900 for determining a multiple object user input command. The operations of the process 1900 are described generally as being performed by the system 300. The operations of the process 1900 may be performed exclusively by the system 300, may be performed exclusively by another system, or may be performed by a combination of the system 300 and another system. In some implementations, operations of the process 1900 may be performed by one or more processors included in one or more electronic devices.

The system 300 capture images from multiple cameras (1902). For instance, the system 300 controls multiple cameras to capture one or more images of an area in front of a display screen. The multiple cameras may be oriented at different angles and in different directions to provide images with different perspectives of the front of the display screen. The different perspectives may be compared together to more accurately determine a position of multiple objects in an area in front of the display screen. The cameras may be oriented to detect screen touch input (e.g., relatively near hover inputs) and/or relatively far hover inputs. The multiple cameras may include two, three, four, or any number of cameras. As the number of cameras increases, the accuracy of detection may increase, but the amount of time to process the images also may increase.

The system 300 detects multiple objects within the multiple camera images (1904). The system 300 may use any suitable object detection technique to detect objects within an image. For instance, to name a few examples, the system 300 may extract features or edges from the images, the system 300 may compare the images to a background model to detect differences, and/or the system 300 may analyze series of images for motion in front of the display screen. The system 300 also may use illumination sources to detect illuminated objects within the images using the techniques described throughout the disclosure.

In some examples, multiple objects may be detected in each of the images captured by the multiple cameras. However, in other examples, multiple objects may be detected in only a subset of the captured images. In these examples, one or more of the objects may not be detected in one or more images due to occlusion or other factors, such as camera position.

The system 300 determines a position of the multiple objects relative to a display surface based on the multiple camera images (1906). For example, the system 300 analyzes the detected objects in each of the multiple camera images and determines a position of each detected object in each of the camera images. In this example, the system 300 uses the determined positions of an object from images captured by different cameras to determine a position of the object relative to the display surface. The system 300 may use any appropriate technique, such as triangulation, to determine the position of the object relative to the display surface based on the position of the object within the multiple camera images.

When ambiguity in the position of the multiple objects exist, the system 300 attempts to resolve the ambiguity using estimation techniques that estimate the most likely positions of the objects. In addition, the system 300 may capture additional images to gain more information that may assist in resolving the ambiguity. Techniques to resolve ambiguity in the position of the multiple objects are discussed below.

When an object is missing from one or more images (e.g., due to occlusion), the system 300 attempts to determine the position of the object using estimation techniques that estimate the position of the object based on a detected position of the object in one image and its determined absence in another image. Techniques to handle occlusion and missing objects are discussed below.

The system 300 determines a multiple object user input command based on the determined positions (1908). For instance, the system 300 analyzes the determined positions of the objects and determines multiple touch inputs at the display screen. The system 300 may map the multiple touch inputs to elements displayed on the display screen and control an application based on the mapping (e.g., the system 300 may activate multiple input buttons based on the multiple touch inputs).

In addition, the system 300 may track movement of the multiple objects relative to one another and determine a multiple object gesture. For example, the system 300 may detect two objects moving toward one another and interpret that as a command to zoom in a display. In another example, the system 300 may detect two objects moving away from one another and interpret that as a command to zoom out a display.

FIGS. 20-44 illustrate example systems and techniques for detecting multiple object input. The example systems and techniques described with respect to FIGS. 20-44 may be applied to the process 1900 described above with respect to FIG. 19.

Multi-Touch with Two Cameras

Two fingers may not be robustly tracked using two cameras in all situations. The two main issues with tracking using only two cameras are occlusion and ambiguity.

Figure 20A:
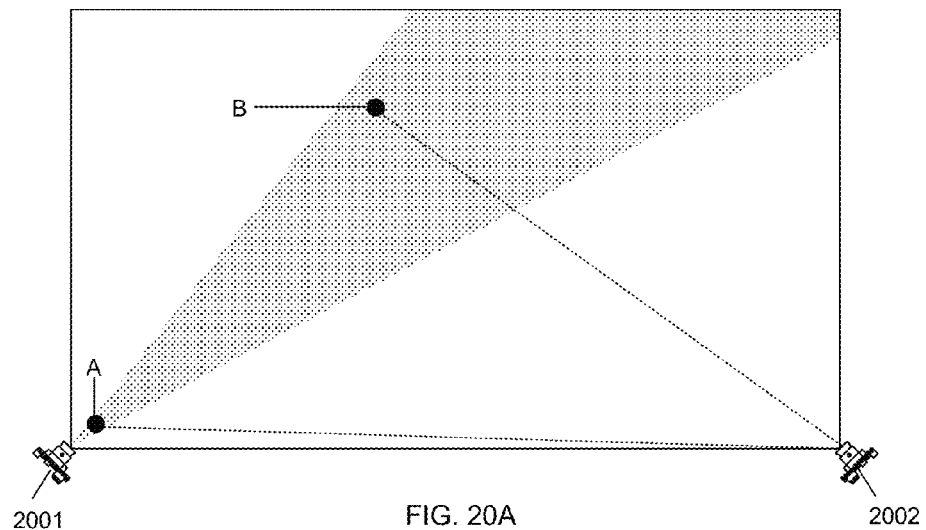
FIG. 20A illustrates an example of occlusion where finger A is touching the screen near the bottom-left camera.

A finger may be detected by at least two cameras 2001 and 2002 in order to triangulate its position, therefore, a finger may be lost if it is occluded in either camera's view. An example of occlusion is shown in FIG. 20A, where finger A is touching the screen near the bottom-left camera. Finger B is within the finger A's "shadow", and therefore finger B cannot be detected by the camera 2001. The chance of a finger being lost due to occlusion is fairly common, since the user only has to move one finger to a corner of the screen in order to lose the other finger.

Figure 20B:
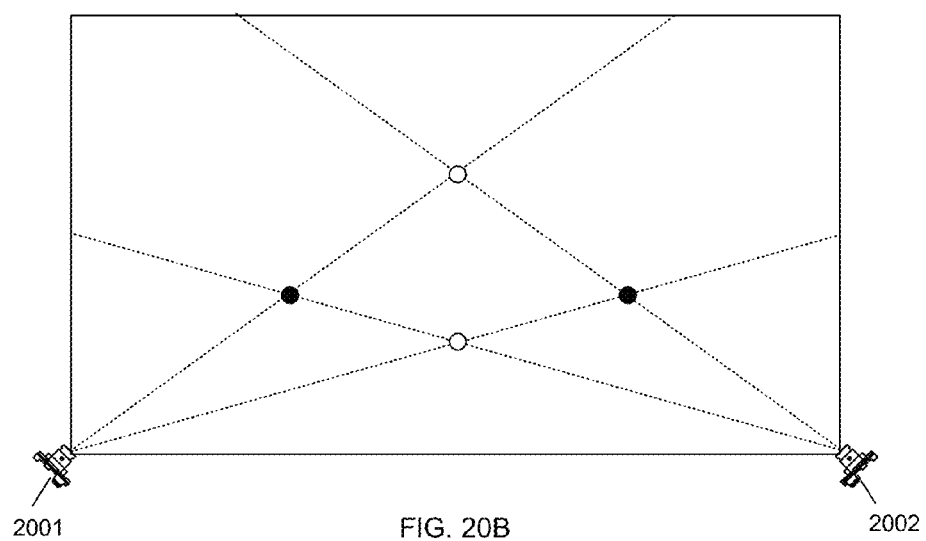
FIG. 20B depicts an ambiguity where the fingers may be in either the positions indicated by the dark circles, or the positions indicated by the light circles.
Figure 21:
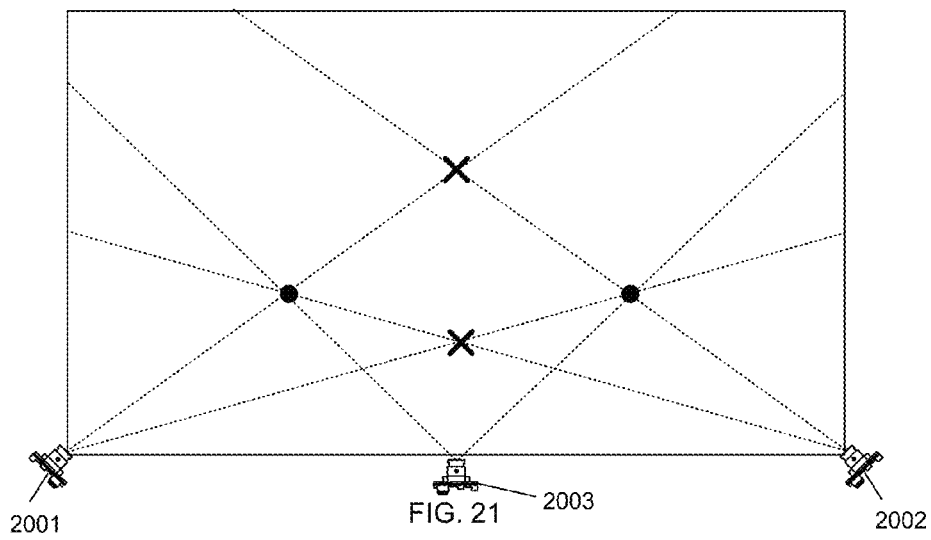
FIG. 21 illustrates how the third camera also may resolve the ambiguity problem, since one of the two possible pairs of finger positions is consistent with the positions detected in the third camera.

Each camera independently detects the position of a finger within its image, and the finger's position is triangulated. When two or more fingers are touching the screen, each camera detects multiple positions, resulting in multiple ambiguous finger positions. For example, FIG. 20B depicts an ambiguity where the fingers may be in either the positions indicated by the dark circles, or the positions indicated by the light circles. The software may predict which of the possible positions are the real finger positions, and may select the incorrect finger positions when the fingers are close together.

Multi-Touch with Three or More Cameras

The use of three cameras 2001, 2002, and 2003 provides more robust tracking of two fingers. The problem of occlusion may not be as much of a concern, because even if one camera is occluded, the other finger is still detected by the two other cameras. The third camera also may resolve the ambiguity problem, since one of the two possible pairs of finger positions is consistent with the positions detected in the third camera, as shown for example in FIG. 21. The use of three cameras may allow three or four fingers to be tracked with a high level of robustness.

Figure 22:
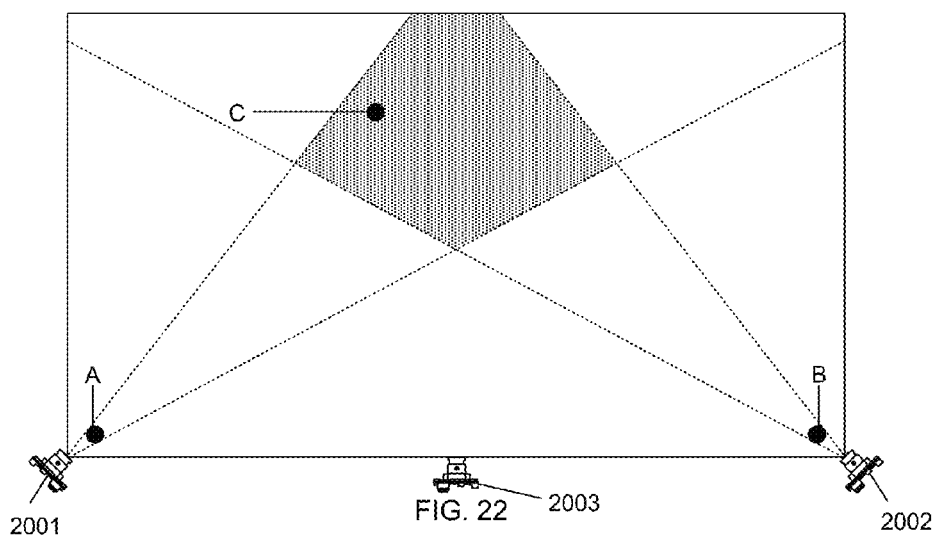
FIG. 22 illustrates that when tracking three fingers using three cameras, it is possible for a user to occlude two cameras.

When tracking three fingers using three cameras, it is possible for a user to occlude two cameras, as illustrated in FIG. 22. However, the likelihood of a user inadvertently occluding two of three cameras is much less than the likelihood of a user occluding one of two cameras, so tracking three fingers using three cameras is more robust than tracking two fingers with two cameras.

Figure 23:
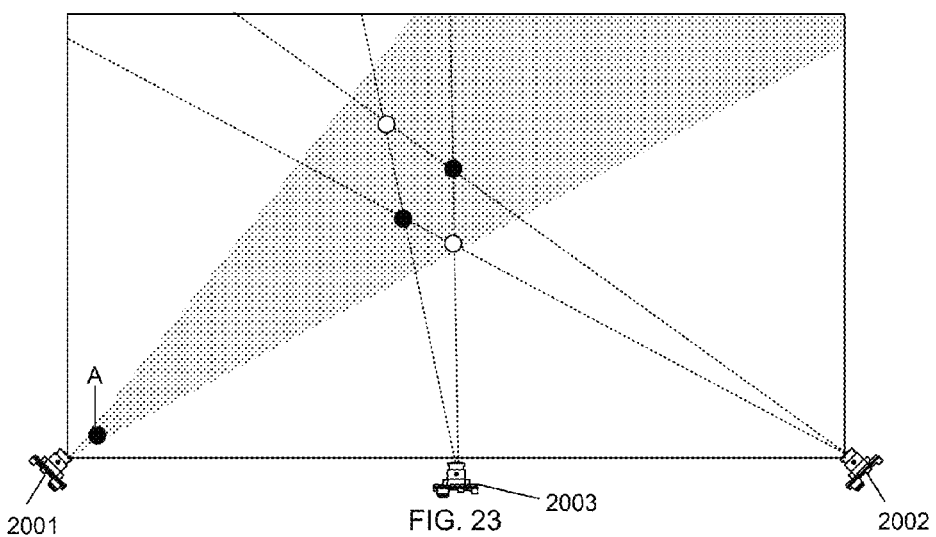
FIG. 23 illustrates that when tracking three fingers using three cameras, it is also possible for a user to occlude one camera's view of both other fingers while creating an ambiguity with the remaining two fingers.

When tracking three fingers using three cameras, it is also possible for a user to occlude one camera's view of both other fingers while creating an ambiguity with the remaining two fingers, as illustrated in FIG. 23. However, the likelihood of the user occluding two fingers with a single finger and the software prediction selecting the incorrect finger positions are relatively less likely.

Placement of Three or Four Cameras

Figure 24:
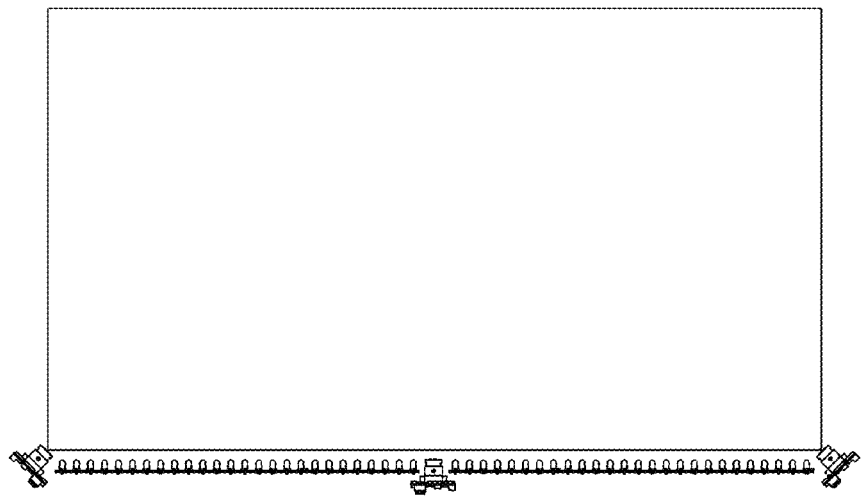
FIG. 24 illustrates that when three or four cameras are placed along one side, all of the cameras may share the same illumination.
Figure 25:
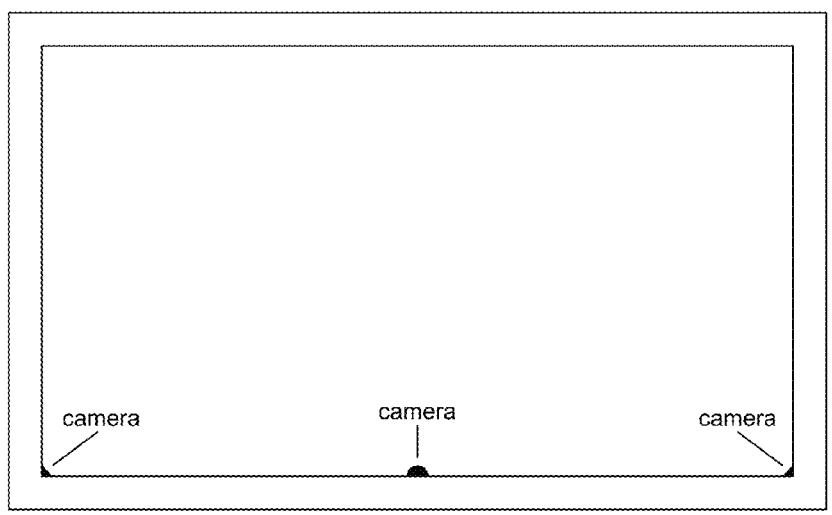
FIG. 25 illustrates that the middle camera(s) may require a protrusion in the bezel's shape.
Figure 26:
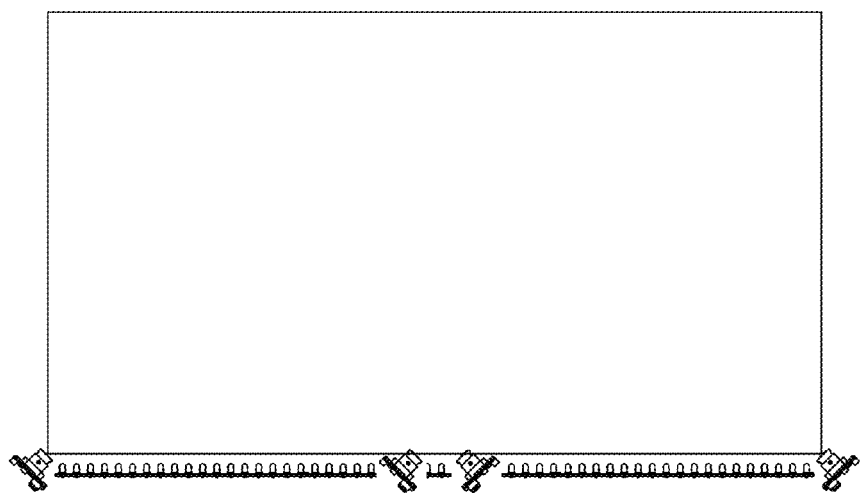
FIG. 26 illustrates that two cameras may be added, where each middle camera has a 90 degree field of view and images half of the screen.
Figure 27:
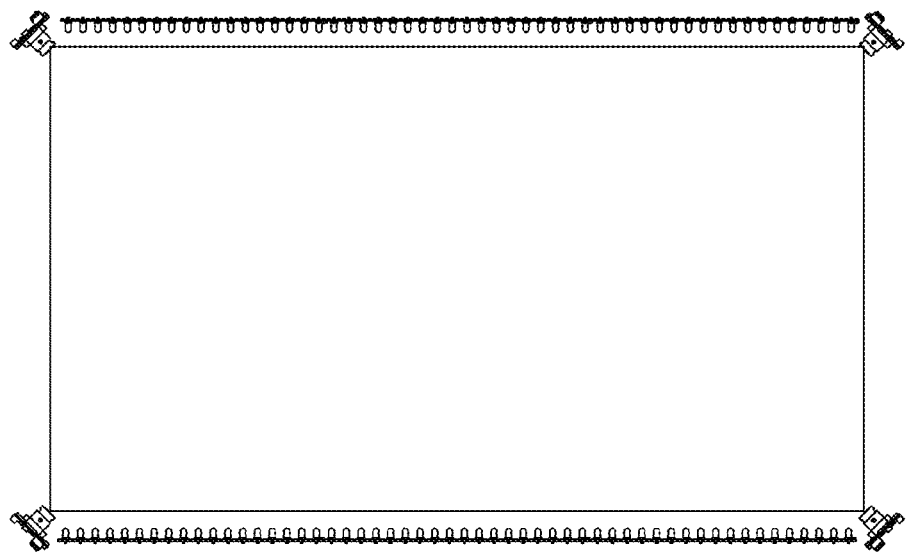
FIG. 27 illustrates that when three or four cameras are placed in opposite corners, each camera may use similar optics.

The cameras may be placed all along one side as illustrated in FIG. 24, or the cameras can be placed in opposite corners as illustrated in FIG. 27. When three or four cameras are placed along one side, as shown in FIG. 24, all of the cameras may share the same illumination. However, the middle camera(s) may require a protrusion in the bezel's shape, as illustrated in FIG. 25. The middle camera may have extra-wide angle optics for a field-of-view of nearly 180 degrees. Alternatively, two cameras may be added as shown in FIG. 26, where each middle camera has a 90 degree field of view and images half of the screen.

Figure 28:
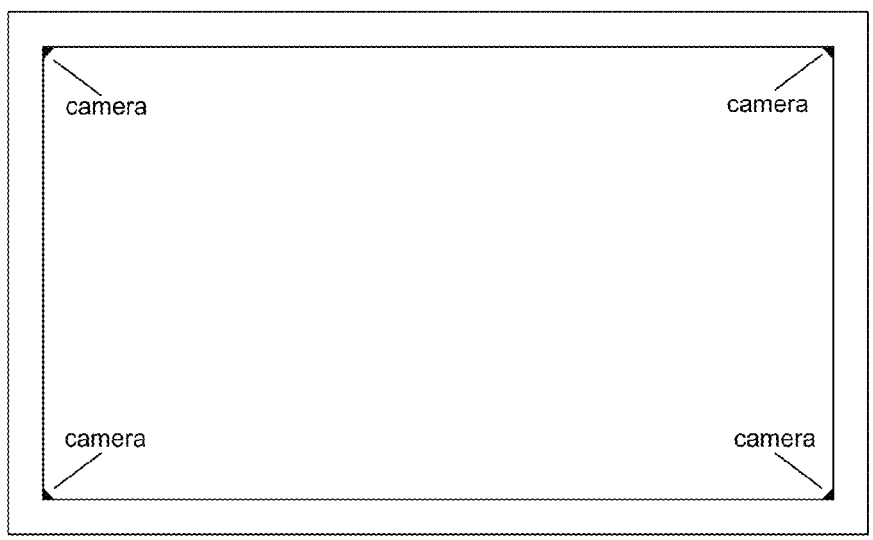
FIG. 28 illustrates that each camera may be hidden within the bezel.

When three or four cameras are placed in opposite corners, as shown in FIG. 27, each camera may use similar optics, and may be hidden within the bezel as illustrated in FIG. 28. However, the third (and fourth) cameras may not share the emitters used by the first and second cameras, and therefore additional emitters may be added to another side of the screen.

Also, in order to avoid camera blooming, the third and forth cameras may capture images at a different time than the first and second cameras. Therefore, the overall tracking rate may be reduced. If the cameras capture images at one hundred and twenty frames-per-second, the positions of fingers are updated sixty times a second. Placement of the cameras in opposite corners may offer an advantage if combined with a zero to one inch hover solution, because it may allow hovering fingers to be detected over the entire screen surface.

Zero to One Inch Hover

Fingers may be tracked hovering zero to one inch above the screen. This permits a cursor (or other displayed object) to be moved without touching the screen. The finger may be tracked to detect when it touches the surface of the screen, providing two states, similar to the left-click and un-clicked states of a mouse. Using zero to one inch hover therefore may simulate a mouse. Additionally, an approximate height above the screen may be tracked for fingertips hovering above the screen, providing an x, y, z-coordinate for each fingertip.

The system also may detect if a finger is touching the screen. The system may detect if a finger touches its reflection in the screen's surface, which may provide more precision than simply testing the triangulated z-coordinate.

Two options for tracking the finger hovering zero to one inch above the screen are presented. Also, the placement of cameras impacts the parts of the screen where hovering fingers may be detected.

Placement of Three or Four Cameras

Figure 29:
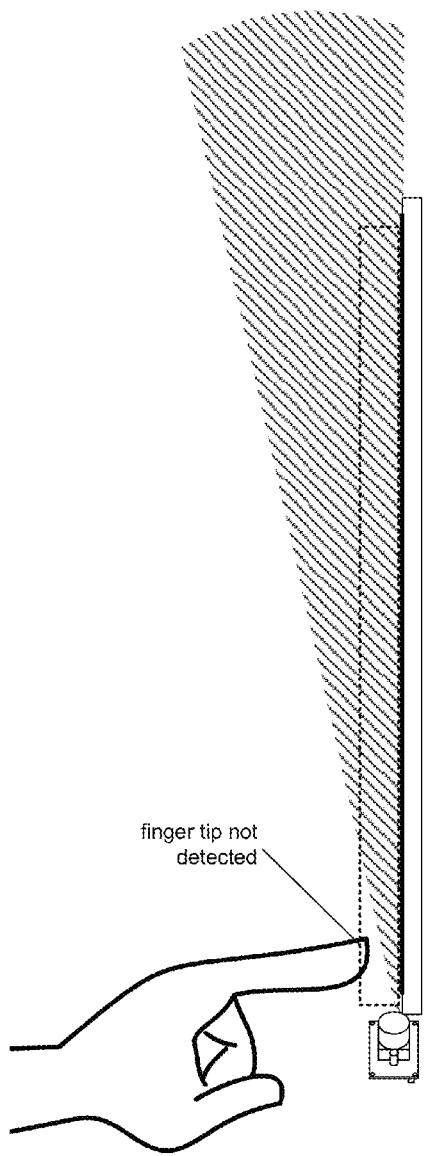
FIG. 29 illustrates that when all cameras are placed along the same side, the cameras may not detect fingers hovering near to that side.
Figure 30:
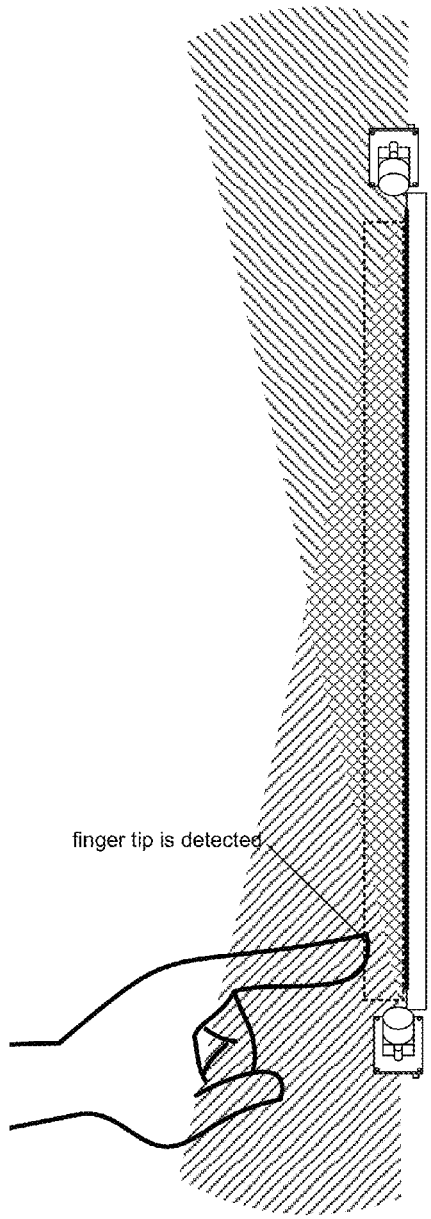
FIG. 30 illustrates that when cameras are placed in opposite corners of the screen, hovering fingers may be detected over the entire screen area.

When all cameras are placed along the same side, the cameras may not detect fingers hovering near to that side, as shown in FIG. 29. When cameras are placed in opposite corners of the screen, hovering fingers may be detected over the entire screen area, as shown in FIG. 30.

Configuration without Side Emitters

Figure 31:
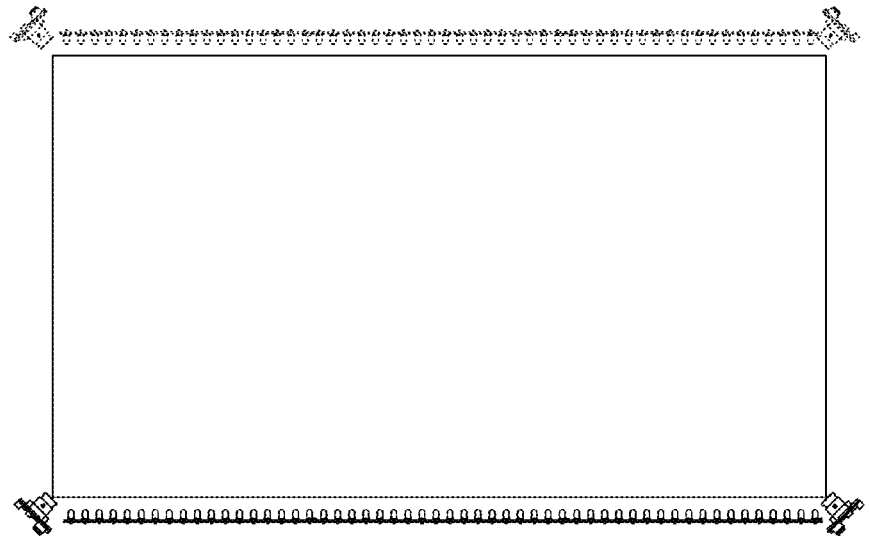
FIG. 31 illustrates that it is possible to track a finger, or multiple fingers, hovering zero to one inches above the screen using emitters along only one side of the screen (or two sides if cameras are placed in opposite corners).

It is possible to track a finger, or multiple fingers, hovering zero to one inches above the screen using emitters along only one side of the screen (or two sides if cameras are placed in opposite corners), as shown in FIG. 31. Objects beyond the edge of the screen may be illuminated and detected by the camera. Moving objects may interfere with the detection of fingers. Examples of moving objects that may interfere with tracking include the cable of a mouse moving on the desk's surface, the user's feet (if the monitor is placed on a wall or edge of a table), another user moving above the monitor or leaning on the top of the monitor, or a ceiling fan located above the monitor. The software may learn and adapt to most stationary objects (such as the surface of a desk below the monitor, or a shelf above the monitor) beyond the edges of the monitor. However, stationary objects may interfere if the monitor wobbles (for example, when it is touched). The overall tracking rate for this configuration is half the camera's frame rate if all cameras are on the same side of the screen, or a third of the camera's frame rate if cameras are in opposite corners of the screen.

Configuration with Side Emitters

Figure 32:
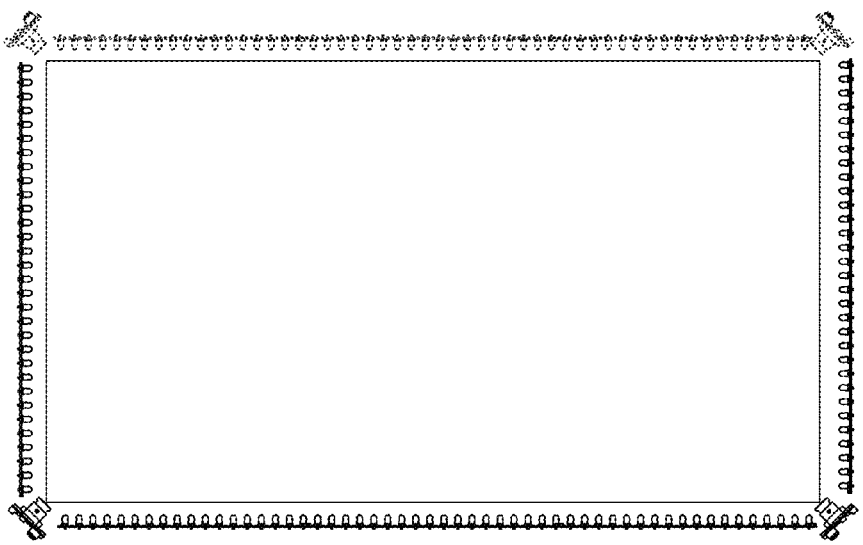
FIG. 32 illustrates that greater robustness may be achieved when additional emitters are placed along the sides of the screen.

Greater robustness may be achieved when additional emitters are placed along the sides of the screen, as shown in FIG. 32. Each emitter projects light at a different time, and different parts of each camera's field-of-view are captured at different times. This enables objects, either moving or stationary, to be ignored on all sides, above, and below, the monitor, as long as those objects are at least a couple of inches away from the edge of the monitor. The exact distance depends on the LEDs, and is minimized when narrow-angle LEDs are used. The overall tracking rate for this configuration is a third of the camera's frame rate if all cameras are on the same side of the screen, or a fourth of the camera's frame rate if cameras are in opposite corners of the screen.

One to Six Inch Hover

Fingers may be tracked hovering one to six inches above the screen. That distance may be expanded to eight or more inches, depending on the LEDs. Hover one to six inches may provide an x, y, z-coordinate for each finger tip. Hover one to six inches above the screen also may be combined with gesture tracking, to detect and interpret hand movements (e.g., a hand swipe) as a gesture.

One to six inch hover may not, by itself, detect a fingertip at a distance of less than one inch due to the blooming of the emitters within the camera. However, one to six inch hover may be combined with zero to one inch hover, to provide continuous tracking of the finger tips between zero and six inches.

Some users may find it difficult to move their finger in and out of the screen, within the range of one to six inches, while maintaining the x, y position of their finger over a button. Therefore, zero to one inch hover may be used over one to six inch hover for simulation of mouse click events. In addition, one to six inch hover may be used over zero to one inch hover for gesture detection, such as hand swipe gestures.

Figure 33:
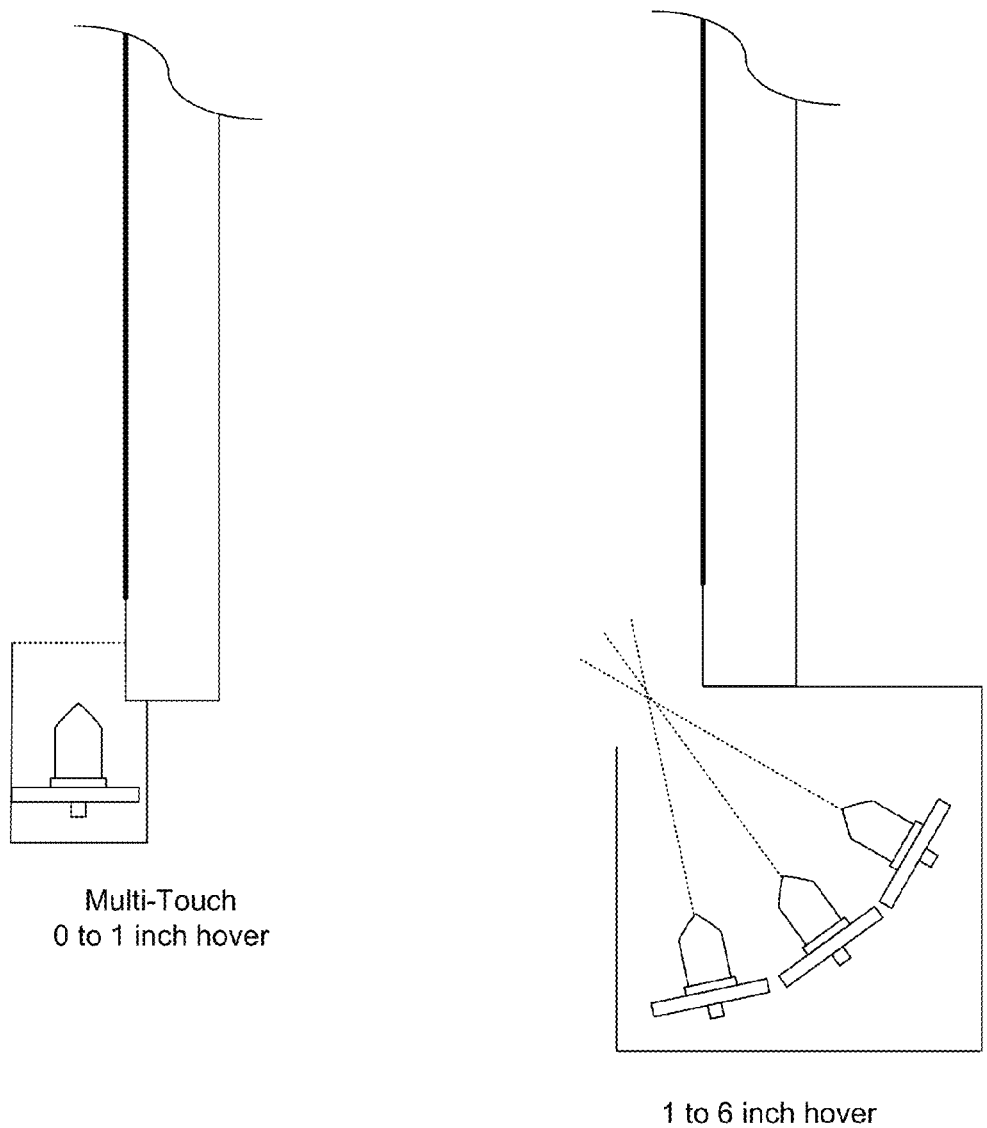
FIG. 33 illustrates that one to six inch hover may use multiple rows of LED emitters embedded into the screen's bezel.
Figure 34:
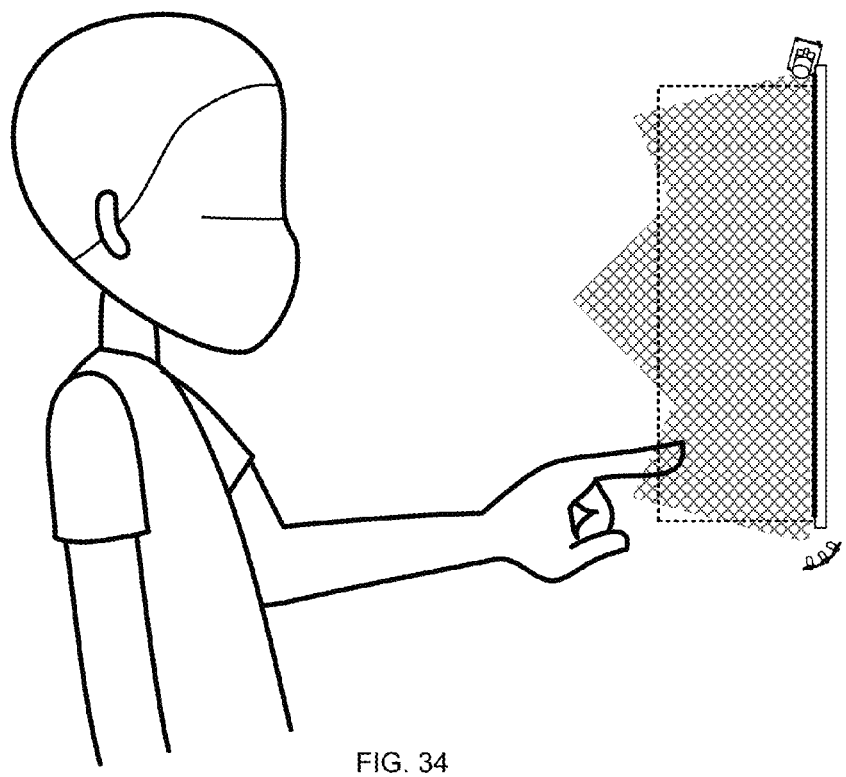
FIG. 34 illustrates a detection region.
Figure 35:
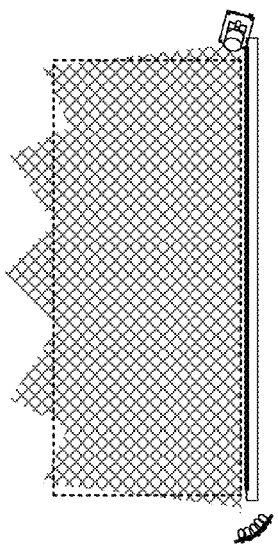
FIG. 35 illustrates that additional rows of LEDs provide a more precise detection region.
Figure 36:
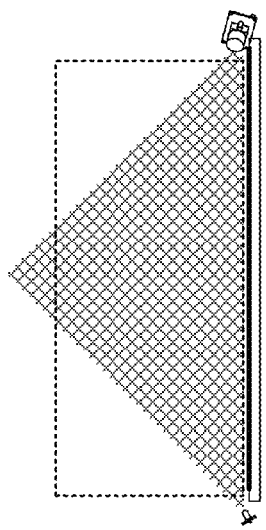
FIG. 36 illustrates that if one to six inch hover is used near the middle of the screen, a single row of LEDs may be used.

One to six inch hover may use multiple rows of LED emitters embedded into the screen's bezel, as illustrated in FIG. 33, in comparison to the bezel design for Multi-Touch and Zero to One inch hover. These multiple rows illuminate the finger exclusive of illuminating the user's body. A detection region is illustrated in FIG. 34. Three rows may be used. Additional rows of LEDs provide a more precise detection region, as illustrated in FIG. 35. If one to six inch hover is used near the middle of the screen, a single row of LEDs may be used as shown in FIG. 36.

The camera may capture each row of LEDs at a different time. Therefore, the tracking rate may be reduced. If combined with multi-touch, but not zero to one inch tracking, a tracking rate of a fourth of the camera frame rate may be achieved. If combined with multi-touch and zero to one inch tracking, with cameras in opposite corners, the tracking rate would be a tenth of the camera frame rate. In this worst case scenario, the positions of fingers would be updated twelve times a second if one hundred and twenty hertz cameras are used. A faster camera would achieve a higher tracking rate.

Examples of Configuration Aspects

| Placement of three or four cameras: | |
| --- | --- |
| Along the same edge | In opposite corners |
| Extra-wide-angle optics for fourth camera may be used | Same optics for all cameras may be used |
| Small protrusion of the middle camera(s) in the bezel | No (or relatively minor) disturbances in the bezel shape |
| Minimum number of emitters | Additional emitter(s) may be used on opposite side |
| Maximum rate of tracking | Reduced rate of tracking |
| Hover may not be detected near the edge where cameras are installed. | Hover may be detected over entire screen area. |

| Multi-touch: | |
| --- | --- |
| Two cameras | Three or more cameras |
| May enable tracking of two fingers with a relatively low degree of robustness | May enable tracking of two fingers with a relatively high degree of robustness |
| May enable tracking of three or four fingers with a relatively low degree of robustness | May enable tracking of three or four fingers with a relatively high degree of robustness |

| Zero to One inch hover techniques: | |
| --- | --- |
| Without side emitters | With side emitters |
| Moving objects above or below the screen may interfere with detecting and tracking fingers | Objects to all sides, above, and below the screen may be ignored |
| Wobbling screen may interfere with detecting and tracking fingers | Wobbling screen may not affect detecting and tracking fingers |
| Minimum number of emitters | Additional emitters may be needed on the sides of the screen |
| Maximum rate of tracking | Reduced rate of tracking |

| Overall: | | | |
| --- | --- | --- | --- |
| Multi-Touch only | Multi-Touch with 0 to 1 inch hover | Multi-Touch with 1 to 6 inch hover | Complete |
| Emitters: 27 to 54 inch total length, depending on options* | Emitters: 27 to 84 inch total length, depending on options* | Emitters: 81 to 162 inch total length, depending on options* | Emitters: 111 to 192 inch total length, depending on options* |
| Tracking rate: 1 to ½ camera rate, depending on options | Tracking Rate: ½ to ⅓ camera rate, depending on options | Tracking Rate: ¼ to ⅛ camera rate, depending on options | Tracking rate: ⅕ to ¹⁄₁₀ camera rate, depending on options |
| Output: x-y position of fingers touching screen | Output: x-y-z position of fingers up to 1 inches from screen; touch-state | Output: x-y position of fingers touching screen, x-y-z 1 to 6 inches, no position between 0 and 1 inches | Output: x-y-z position of fingers up to 6 inches from screen; touch-state |
| Bezel: Small | Bezel: Small | Bezel: Large | Bezel: Large |

*Lengths correspond to an example thirty-two" diagonal widescreen apparatus. Lengths for other screen dimensions may be proportional.

Multi-Touch Implementations

Two Cameras

Figure 37:
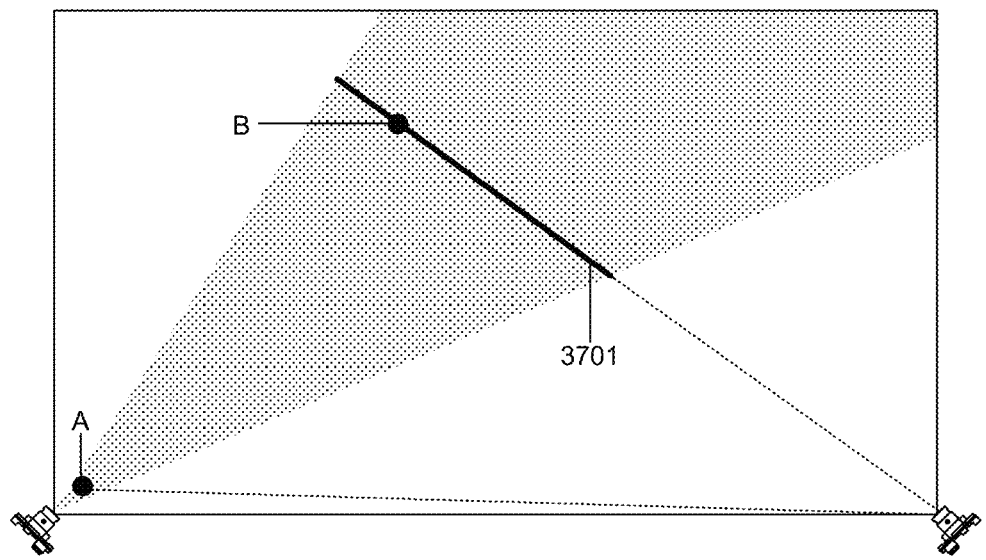
FIG. 37 illustrates that when a finger is close to a camera, that finger may occlude the camera's view of a second finger.

Two issues may exist with performing dual-touch or multi-touch tracking using two cameras: occlusion and ambiguity Occlusion When a finger is close to a camera, that finger may occlude the camera's view of a second finger. In the example of FIG. 37, finger A is touching the screen near the bottom-left camera. The shaded region shows the part of the screen that is occluded from that camera's view by finger A. Finger B is shown touching the screen. Both fingers are detected by the bottom-right camera, but finger B is occluded by finger A. The software may determine that finger B is somewhere along line segment 3701, but may not be able to determine its exact position.

This situation may occur unintentionally during normal dual-touch operation. For example, a user interface may include buttons and menus near the corners of a screen. In another example, in a photo viewer, a user may enlarge a photo by dragging his fingers to opposite corners of the screen.

Ambiguity

Each camera independently detects the position of a finger along a line-segment, and a finger's position within the screen is triangulated as the intersection of those line-segments. When two fingers are touching the screen, each camera detects up to two line-segments, and there are two possible combinations of intersection points.

Figure 38:
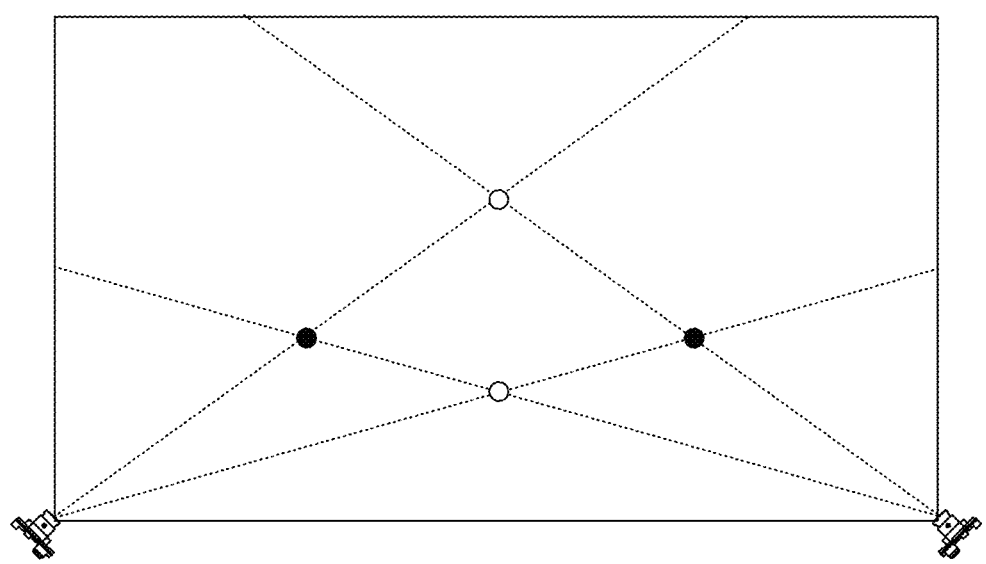
FIG. 38 illustrates an example where each camera detects two fingers along the line segments shown.

In the example of FIG. 38, each camera detects two fingers along the line segments shown. It is ambiguous whether the fingers are in the positions indicated by the dark circles, or the light circles.

Numerous ways exist to reduce, but not eliminate, ambiguity. Some ambiguity may be resolved by matching the time of entry of fingers, the previous known finger positions, their relative sizes, brightness, etc.

Figure 39:
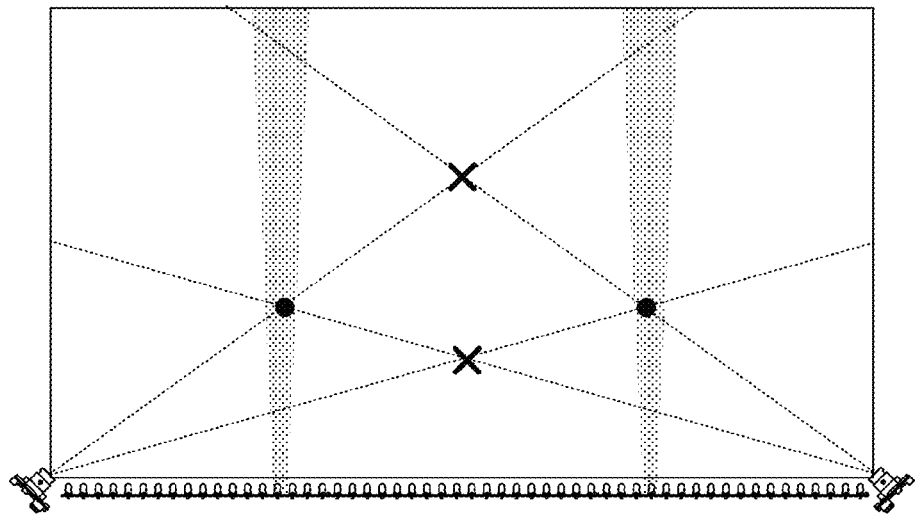
FIG. 39 illustrates an example whereby whenever an ambiguous condition is detected, the processor may instruct the emitters to illuminate just the column of light including one of the possible finger positions, and then the other possible finger positions.

Some ambiguity also may be resolved using controlled illumination, whereby whenever an ambiguous condition is detected, the processor may instruct the emitters to illuminate just the column of light including one of the possible finger positions, and then the other possible finger positions. An example is illustrated in FIG. 39. This may complicate the illumination hardware, because the controller is capable of turning on individual LEDs, and it also may reduce the rate of tracking because the system captures additional images of the finger before generating a position. Also, when the finger positions are not sufficiently spaced apart, illuminating only one set of possible finger positions at a time may be difficult. The minimum distance between the fingers, and between the possible positions, is dependent on the spacing and angle of half intensity characteristics of the LED emitters, and may be a couple of inches.

Three or More Cameras

Using three or more camera may resolve the occlusion and ambiguity problems for dual-touch, and may significantly minimize those problems for the detection of three and four fingers. Adding the third camera gives another perspective of the fingertips, which may be used to resolve ambiguity and detect occlusion.

Occlusion

Figure 40:
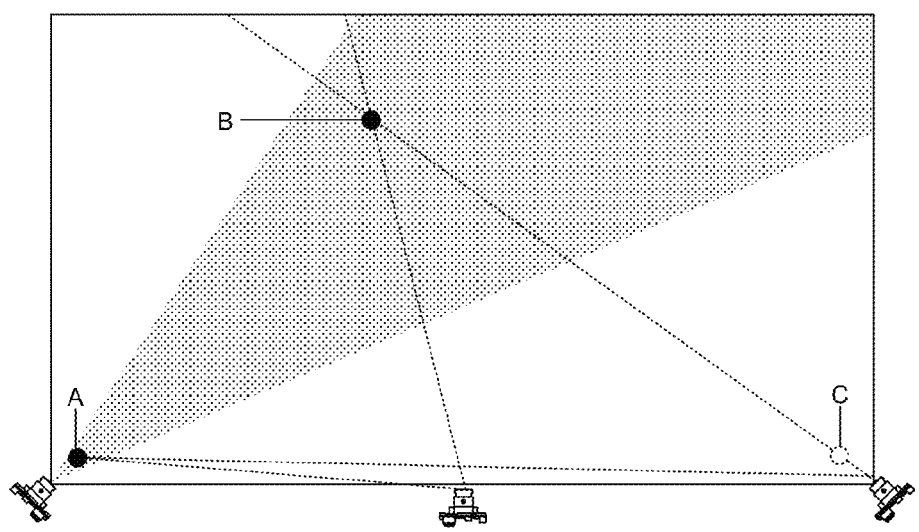
FIG. 40 depicts finger A near a camera, thereby occluding that camera's view of finger B.
Figure 41:
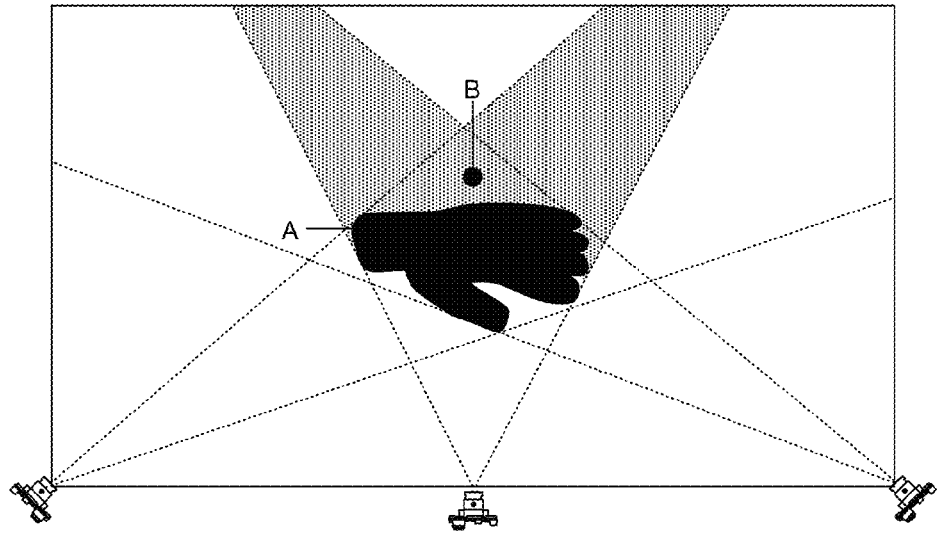
FIG. 41 illustrates that occlusion also may occur if the user places their hand, arm, or other parts of their body onto the screen.

FIG. 40 depicts finger A near a camera, thereby occluding that camera's view of finger B. However, finger B is still detected by two cameras, and therefore its position may be triangulated by those two cameras. This scenario may also apply to other camera placements not shown in FIG. 40.

When three or more cameras are used, occlusion may occur with at least three fingers, and the circumstances of occlusion may be less likely to happen inadvertently than two-camera occlusion. Occlusion with three cameras results when two cameras are blocked, for example, by finger A and finger C in FIG. 40. While many interfaces involve a user touching one corner of the screen, it is relatively unlikely that a user naturally touches both corners at the same time. In addition, the system may control placement of user input elements in areas that avoid occlusion and are relatively easy to detect.

Occlusion also may occur if the user places their hand, arm, or other parts of their body onto the screen. For example, in FIG. 41, a user places hand A against the screen, which occludes the shaded area from view by two cameras. A finger, such as finger B, is shielded from the cameras by the hand. However, like the situation depicted in FIG. 40, this situation is relatively unlikely to occur during normal user operation.

Ambiguity

Figure 42:
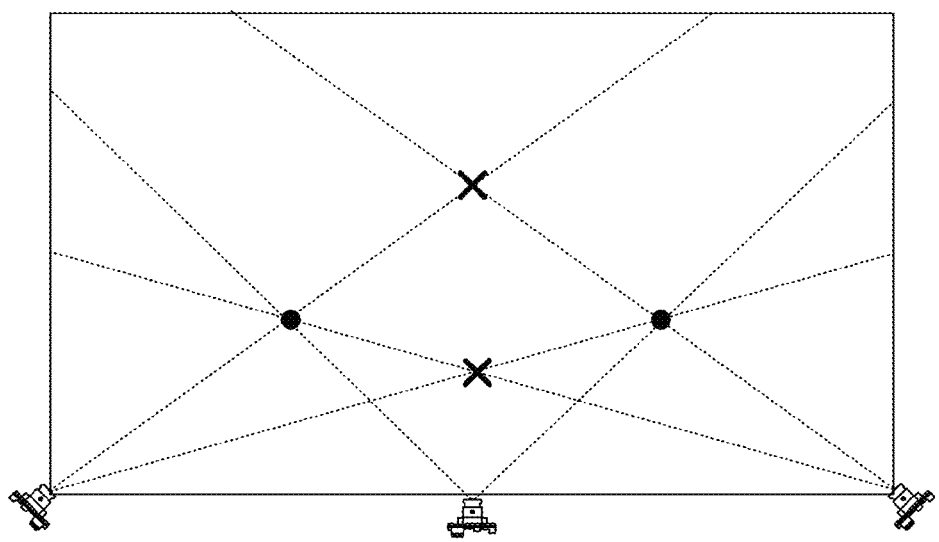
FIG. 42 illustrates a dual finger placement that is ambiguous with only two cameras is resolved using three cameras, since only two of the four possible finger positions lie on line-segments projected from the third camera.

The addition of the third camera detects the position of each finger along an additional line-segment, and the finger's position within the screen is triangulated as the intersection of three line-segments. As illustrated in FIG. 42, a dual finger placement that is ambiguous with only two cameras is resolved using three cameras, since only two of the four possible finger positions lie on line-segments projected from the third camera. This scenario may also apply to other camera placements not shown in FIG. 42.

Ambiguity results when at least three fingers are in a configuration that produces occlusion. For example, if a third finger is added to FIG. 42, and that finger occludes the middle camera, only two cameras detect the other two fingers. This ambiguity may be resolved by matching the time of entry of fingers and the previous known finger positions. The ambiguity may not be resolved if the occluding finger enters at the exact same time as both other fingers, however this is unlikely to occur during normal user operation.

Placement of Three or More Cameras

Along One Side

Figure 43:
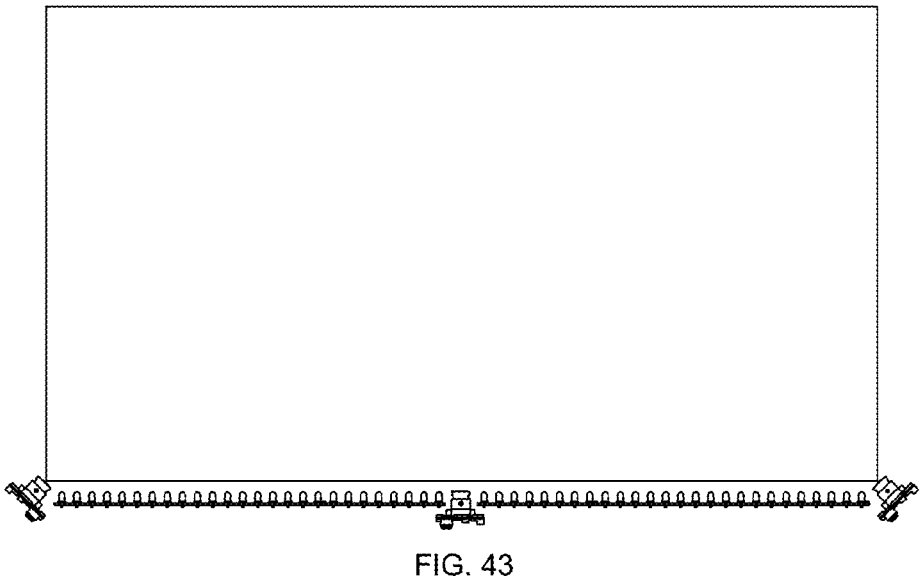
FIG. 43 illustrates that three or more cameras may be placed along one side.

Three or more cameras may be placed along one side, as shown for example in FIG. 43. The camera optics may be sufficiently small such that it will not significantly affect any illumination installed along that side. For example, the camera optics may be placed between two LEDs, or at most, cause a gap of only one LED in the emitter.

The middle camera may require a wide field-of-view. Special wide-angle optics with a field of view close to 180 degrees may be used. To avoid the wide-angle optics, two middle cameras may be added, each with a 90 degree field of view that, when combined, cover the entire screen area by at least three of the four cameras.

If installed in a bezel, the middle camera(s) may produce a small protrusion in the bezel's shape. Also, all the cameras may share the same illumination.

In Opposite Corners

Figure 44:
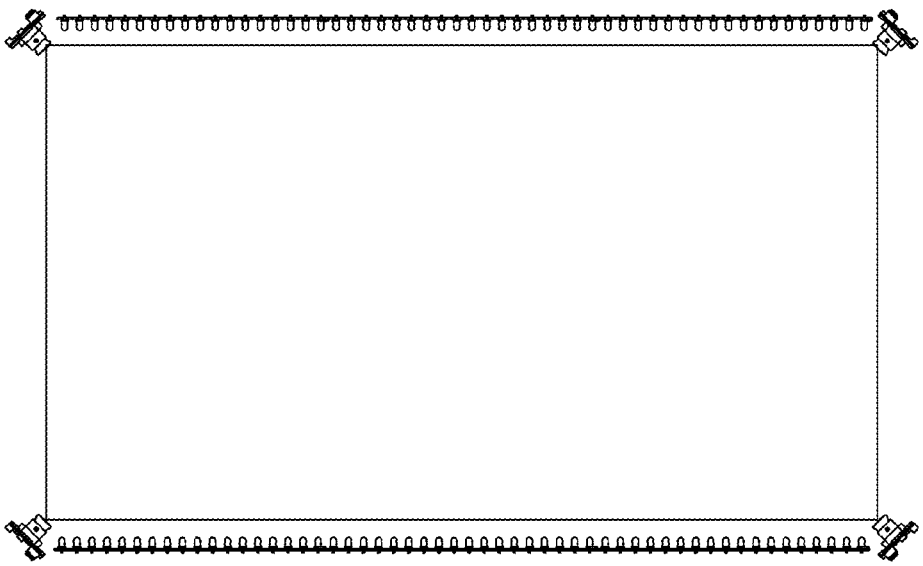
FIG. 44 illustrates that cameras may be installed in three or four corners of the screen.

Cameras may be installed in three or four corners of the screen, as shown in FIG. 44. In this configuration, the cameras may be fitted within a bezel.

The additional cameras may require their own illumination, since the original illumination may only illuminate the back-side of a finger. The illumination on the opposite side of the screen may create blooming. Therefore, to account for the blooming, the cameras on opposite sides of the screen capture images at different times when the opposite emitters are turned off. This reduces the tracking frame rate. The amount by which the tracking rate is reduced depends on the illumination scheme. For example, using one hundred and twenty hertz cameras, adding a third phase to an illumination scheme with two phases, reduces the tracking rate from sixty samples a second to forty samples a second.

Summary of Configuration Examples

| Two-cameras versus three or more cameras | | |
|---|---|---|
| Two Camera | Two Cameras with controlled illumination | Three or more cameras |
| Occlusion may occur during normal usage of the screen, even with just two fingers. | | No occlusion with two fingers. Occlusion may occur with three or four fingers, but is unlikely to occur unintentionally during normal usage scenarios. |
| Ambiguity may not be resolved for all common usage scenarios, even with two fingers. | Ambiguity may be resolved if the fingers are at least a couple of inches apart. Some common ambiguous scenarios may Occur. | No ambiguity with two fingers. Irresolvable ambiguity is possible for three or four fingers, but is unlikely to occur unintentionally during normal usage scenarios. |
| Minimal cost | Additional cost to control individual LEDs | Additional cost of extra camera(s). |

| Placement of three or four cameras | |
|---|---|
| Along the same edge | In opposite corners |
| Extra-wide-angle optics or fourth camera may be used. | Same optics for all cameras may be used. |
| Small protrusion of middle camera(s) in the bezel. | When all cameras in corners, no disturbances (or minimal disturbances) in the bezel shape occur. |
| Minimum number/cost of emitters. | Additional emitter(s) may be used on opposite side. |
| Maximum rate of tracking. | Reduction in the rate of tracking, to capture opposite sides at different times. |

Figure 45:
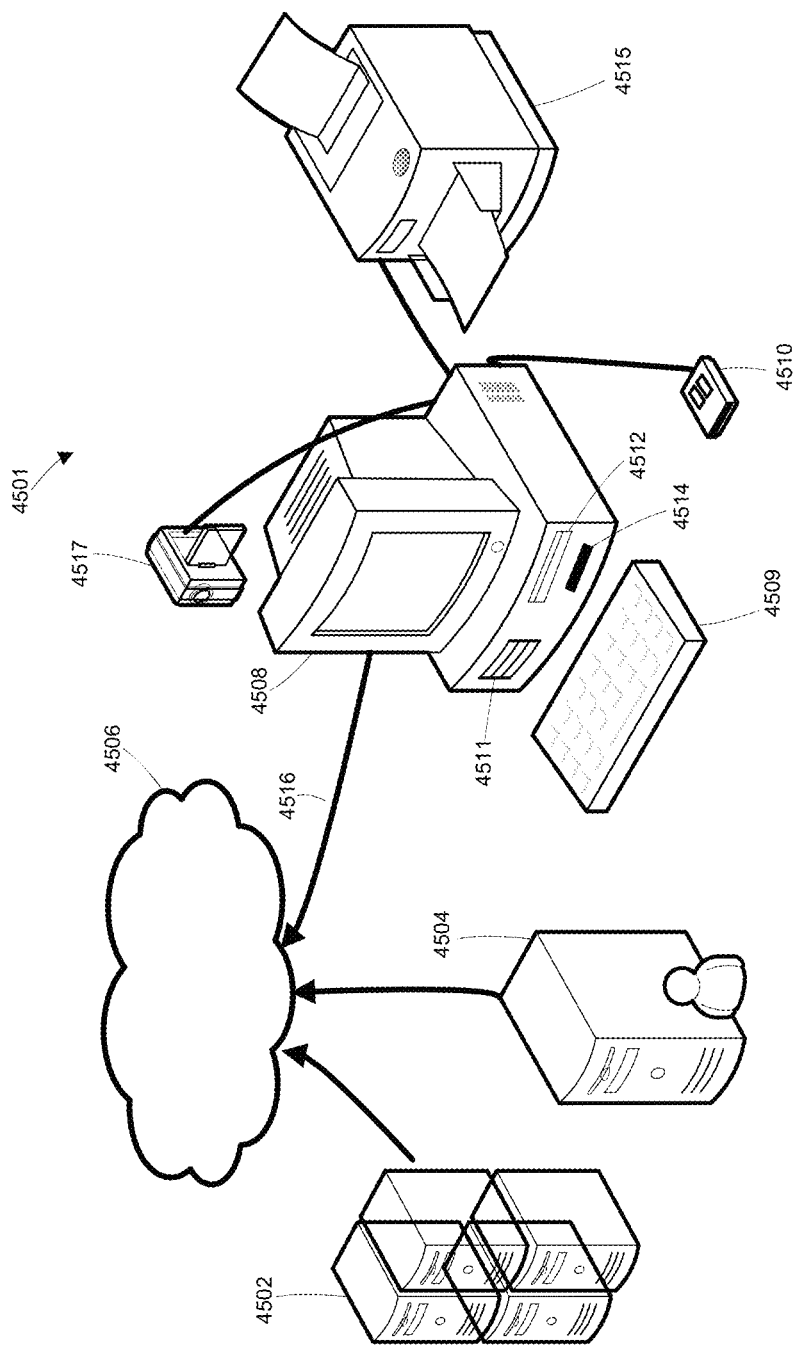
FIG. 45 illustrates components of an exemplary computer processing system.

FIG. 45 illustrates components of an exemplary computer processing system. Briefly, the system 4500 includes a computing device 4501 that includes a processor configured to control an application that is configured to control user input and perform hover detection. The device 4501 may be configured to exchange electronic communications over a network 4506 with one or more servers including a server 4502 and a server 4504.

In more detail, the hardware environment of the computing device 4501 includes a display monitor 4508 for displaying text and images to a user, a keyboard 4509 for entering text data and user commands into the computing device 4501, a mouse 4510 for pointing, selecting and manipulating objects displayed on the display monitor 4508, a fixed disk drive 4511, a removable disk drive 4512, a tape drive 4514, a hardcopy output device 4515, a computer network connection 4516, and a digital input device 4517.

The display monitor 4508 displays the graphics, images, and text that comprise the user interface for the software applications used by the computing device 4501, as well as the operating system programs necessary to operate the computing device 4501. A user uses the keyboard 4509 to enter commands and data to operate and control the computer operating system programs as well as the application programs. The mouse 4510 may be any type of pointing device, and may be a joystick, a trackball, a touch-pad, or other pointing device. Software used to display a user interface and enable a user to enter text, numbers, or select from a menu of options is stored locally on computer readable memory media, such as the fixed disk drive 4511.

In a further implementation, the fixed disk drive 4511 itself may include a number of physical drive units, such as a redundant array of independent disks ("RAID"), or may be a disk drive farm or a disk array that is physically located in a separate computing unit. Such computer readable memory media allow the computing device 4501 to access computer-executable process steps, application programs and the like, stored on removable and non-removable memory media.

The computer network connection 4516 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 4506 may be a LAN network, a corporate or government WAN network, the Internet, or other network.

The computer network connection 4516 may be a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, an orthogonal frequency division multiplexing ("OFDM") ultra wide band ("UWB") wireless connector, a time-modulated ultra wide band ("TM-UWB") wireless connector, or other wireless connector. Example wired connectors include, for example, a IEEE®-2894 FIREWIRE® connector, a Universal Serial Bus ("USB") connector, a serial port connector, a parallel port connector, or other wireline connector.

The removable disk drive 4512 is a removable storage device that is used to off-load data from the computing device 4501 or upload data onto the computing device 4501. The removable disk drive 4512 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 4511 or on removable media for the removable disk drive 4512.

The tape drive 4514 is a tape storage device that is used to off-load data from the computing device 4501 or to upload data onto the computing device 4501. The tape drive 4514 may be a quarter-inch cartridge ("QIC"), 4 mm digital audio tape ("DAT"), 8 mm digital linear tape ("DLT") drive, or other type of tape.

The hardcopy output device 4515 provides an output function for the operating system programs and applications. The hardcopy output device 4515 may be a printer or any output device that produces tangible output objects, including textual or image data or graphical representations of textual or image data. While the hardcopy output device 4515 is depicted as being directly connected to the computing device 4501, it need not be. For instance, the hardcopy output device may be connected to the computing device 4501 via a network interface, such as a wireline or wireless network.

Furthermore, although the computing device 4501 is described above as a desktop PC, in further implementations the computing device 4501 may be a laptop, a workstation, a midrange computer, a mainframe, an embedded system, telephone, a handheld or tablet computer, a PDA, or other type of computer.

Figure 46:
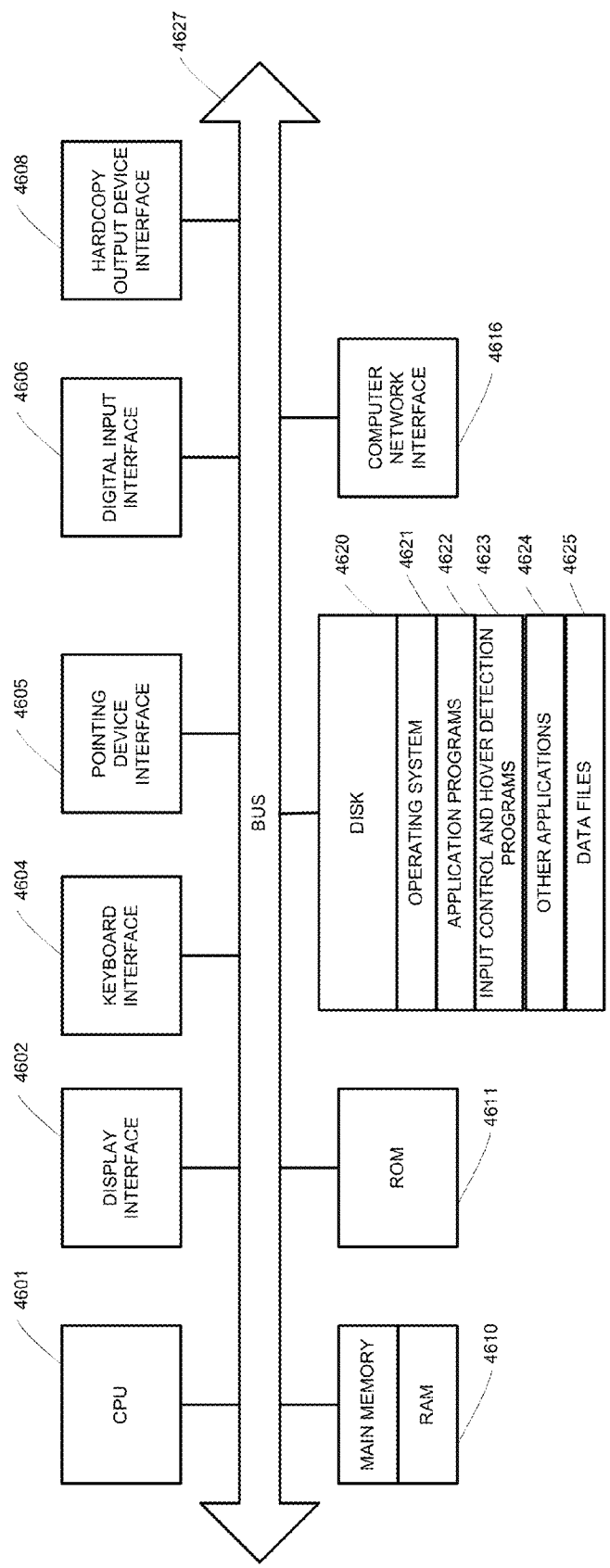
FIG. 46 is a block diagram illustrating the internal architecture of a computer system shown in FIG. 45.

FIG. 46 is a block diagram illustrating the internal architecture of a computer shown in FIG. 45. An exemplary internal architecture of the computing device 4501 is now described. The computing environment includes a computer central processing unit ("CPU") 4601, where the computer instructions that comprise an operating system or an application are processed; a display interface 4602 which provides a communication interface and processing functions for rendering graphics, images, and texts on the display monitor 4508; a keyboard interface 4604 which provides a communication interface to the keyboard 4509; a pointing device interface 4605 which provides a communication interface to the mouse 4510 or an equivalent pointing device; a digital input interface 4606 which provides a communication interface to the digital input device 4517; a hardcopy output device interface 4608 which provides a communication interface to the hardcopy output device 4515; a random access memory ("RAM") 4610 where computer instructions and data are stored in a volatile memory device for processing by the computer CPU 4601; a read-only memory ("ROM") 4611 where invariant low-level systems code or data for basic system functions such as basic input and output ("I/O"), startup, or reception of keystrokes from the keyboard 4509 are stored in a non-volatile memory device; and a storage 4620 or other suitable type of memory (e.g., such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 4621, application programs 4622 (including the input control and hover detection programs 4623, and other applications 4624 as necessary) and data files 4625 are stored; a computer network interface 4616 which provides a communication interface to the network 4506 over the computer network connection 4516. The constituent devices and the computer CPU 4601 communicate with each other over the computer bus 4627.

The RAM 4610 interfaces with the computer bus 4627 so as to provide quick RAM storage to the computer CPU 4601 during the execution of software programs such as the operating system application programs, and device drivers. More specifically, the computer CPU 4601 loads computer-executable process steps from the fixed disk drive 4511 or other memory media into a field of the RAM 4610 in order to execute software programs. Data is stored in the RAM 4610, where the data is accessed by the computer CPU 4601 during execution.

The computing device 4501 stores computer-executable code for an operating system 4621, application programs 4622 such as word processing, spreadsheet, presentation, gaming, or other applications. Although it is possible to display a user interface and enable a user to enter text, numbers, or select from a menu of options using the above-described implementation, it is also possible to implement the functions according to the present disclosure as a dynamic link library ("DLL"), or as a plug-in to other application programs such as an Internet web-browser such as the MICROSOFT® Internet Explorer web browser.

The computer CPU 4601 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER®processor or a proprietary computer processor for a mainframe. In an additional arrangement, the computer CPU 4601 is more than one processing unit, including a multiple CPU configuration found in high-performance workstations and servers, or a multiple scalable processing unit found in mainframes.

The operating system 4621 may be MICROSOFT® WINDOWS NT®/WINDOWS® 2000/WINDOWS® XP Workstation; WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPEN-VMS® for HP ALPHASERVER®-based computers, MAC OS® X for POWERPC® based workstations and servers; SYMBIAN OS®, WINDOWS MOBILE® or WINDOWS CEO, PALM®, NOKIA® OS ("NOS"), OSE®, or EPOC® for mobile devices, or a proprietary operating system for computers or embedded systems. The application development platform or framework for the operating system 4621 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT® .NET Compact.

While FIGS. 45 and 46 illustrate one possible implementation of a computing device that executes program code, or program or process steps, configured to effectuate control of an application that is configured to enable a user to enter text, numbers, or select from a menu of options, other types of computers also may be used as well.

A number of implementations have been described. Nevertheless, it will be understood that various modifications may be made without departing from the spirit and scope of the disclosure. Accordingly, other implementations are within the scope of the disclosure.

What is claimed:

1. An electronic system comprising:
   an image sensor;
   an illumination source configured to illuminate a first area in front of a surface; and
   a processing unit configured to perform operations comprising:

receiving information captured by the image sensor while the illumination source is illuminating the first area in front of the surface; and analyzing the information received from the image sensor to determine user input, wherein analyzing the information comprises:

detecting one or more illuminated objects illuminated by the illumination source;

based on detecting the illuminated objects illuminated by the illumination source, determining that the illuminated objects are within a predetermined distance from the surface; and determining user input based on the objects determined to be within the predetermined distance from the surface.

2. The electronic system of claim 1 wherein the processing unit is configured to perform operations further comprising:

controlling an illumination source to illuminate a second area while the camera is capturing information to define the anticipated input region.

3. The electronic system of claim 1, wherein:

the image sensor has a field of view of the first area in front of the surface; and the illumination source is further configured to illuminate a second area in front of the surface, the second area intersecting the first area to define an anticipated input region within the field of view of the image sensor.

4. The electronic system of claim 3 wherein the image sensor comprises a first camera, the electronic system further comprising:

a second camera having a second field of view of a third area in front of the surface; and wherein the processing unit is configured to perform operations further comprising:

receiving images from the first camera and the second camera while the illumination source is illuminating the second area in front of the surface;

detecting a first object and a second object within the received images based on illumination from the illumination source, wherein the first object is the object;

determining positions of the detected first and second objects based on the received camera images; and determining a multiple object user input command based on the determined positions.

5. The electronic system of claim 3 wherein the illumination source is a first illumination source positioned at a first position, the electronic system further comprising:

a second illumination source positioned at a second position, the second illumination source configured to:

illuminate a third area, the third area intersecting the first area and the second area; and wherein the information comprises a first image and the processing unit is configured to perform operations further comprising:

identifying the first image captured when the first illumination source was illuminated and the second illumination source was not illuminated;

identifying a second image captured when the first illumination source was not illuminated and the second illumination source was illuminated; and analyzing the first image and the second image to determine a position of the object.

6. The electronic system of claim 1, wherein the image sensor comprises a camera and wherein the processing unit is configured to perform operations further comprising:

controlling the illumination source to illuminate the first area in front of the surface in sequence with images captured by the camera in an alternating pattern such that a first image captured by the camera is captured when the illumination source is illuminated and a second image captured by the camera is captured when the illumination source is not illuminated, wherein the information comprises the first image.

7. The electronic system of claim 1 wherein analyzing the information by the processing unit further comprises:

ignoring one or more objects that are within a field of view of the image sensor but not illuminated by the illumination source.

8. The electronic system of claim 1 wherein the predetermined distance is between one and six inches.

9. The electronic system of claim 1 wherein the predetermined distance is less than or equal to one inch.

10. The electronic system of claim 1 wherein the illumination source is a first illumination source positioned at a first position, the electronic system further comprising:

a second illumination source positioned at a second position, the second illumination source configured to:

illuminate a third area, the third area intersecting the first area and a second area; wherein the information comprises a first image and the processing unit is configured to perform operations further comprising:

identifying the first image captured when the first illumination source was illuminated and the second illumination source was not illuminated;

identifying a second image captured when the first illumination source was not illuminated and the second illumination source was illuminated; and analyzing the first image and the second image to determine a position of the object.

11. The electronic system of claim 1 wherein determining user input based on the object detected within the anticipated input region comprises:

mapping a position of the detected object to an interface displayed by an application being controlled; and determining user input based on the mapped position of the detected object to the interface displayed by the application being controlled.

12. The electronic system of claim 1 wherein the surface comprises a surface of a display device and wherein determining user input based on the objects determined to be within the predetermined distance from the surface comprises:

mapping a position of the detected objects to a position on the surface of the display device, wherein the detected object is a finger; and determining user input based on the mapped position of the detected object to the surface of the display device.

13. The electronic system of claim 1 wherein the information comprises first information and the image sensor comprises a first image sensor, the electronic system further comprising:

a second image sensor configured to capture second information; and wherein the processing unit is configured to perform operations further comprising:

triangulating a position of the detected object based on the first information and the second information.

14. The electronic system of claim 1, wherein the one or more objects comprise a first object, the processing unit is configured to perform operations further comprising:

determining user input based on a combination of the first object determined to be within the predetermined distance from the surface and a second object determined to be within the predetermined distance from the surface.

15. The electronic system of claim 1 wherein the one or more objects comprise a finger and wherein determining the user input comprises determining that the finger is hovering within the predetermined distance from the surface.

16. The electronic system of claim 1 wherein the one or more objects comprise a finger and wherein determining the user input comprises determining that the finger is touching the surface.

17. The electronic system of claim 1 wherein the one or more objects comprise a plurality of fingers, wherein the surface comprises a display screen of a display device, and wherein determining the user input comprises determining a multi-touch user input based on the plurality of fingers touching the display screen.

18. The electronic system of claim 1 wherein the surface comprises a surface of a display, and wherein the image sensor and the illumination source are both positioned at a bottom edge of the display.

19. A method for determining user input, the method comprising:
    receiving an image from a camera while an illumination source is illuminating a first area in front of a surface of a display device; and
    analyzing the image received from the camera to determine whether an object within an anticipated input region is substantially in contact with the surface using illumination of the illumination source, wherein analyzing the image comprises:
        distinguishing illuminated objects illuminated by the illumination source from unilluminated objects unilluminated by the illumination source;
        based on distinguishing the illuminated objects illuminated by the illumination source, determining that the illuminated objects are within a predetermined distance from the surface of the display device;
        detecting an object within the anticipated input region based on determining that the illuminated objects are within a predetermined distance from the surface of the display device; and
        determining user input based on the object detected within the anticipated input region.

20. The method for determining user input of claim 19, the method further comprising:
    controlling the illumination source to illuminate a second area while the camera is capturing the image to define the anticipated input region.

21. The method for determining user input of claim 20, wherein controlling the illumination source comprises:
    controlling the illumination source to illuminate the second area in front of the surface in sequence with images captured by the camera in an alternating pattern such that a first image captured by the camera is captured when the illumination source is illuminated and a second image captured by the camera is captured when the illumination source is not illuminated, wherein the image is the first image.

22. The method for determining user input of claim 19 wherein analyzing the image further comprises:
    ignoring one or more objects that are within the camera's field of view but not illuminated by the illumination source.

23. The method for determining user input of claim 19 wherein the predetermined distance is between one and six inches.

24. The method for determining user input of claim 19 wherein the predetermined distance is less than or equal to one inch.

25. The method for determining user input of claim 19 wherein the illumination source is a first illumination source positioned at a first position; the method further comprising:
    illuminating a third area using a second illumination source, the third area intersecting the first area and a second area; wherein the image is a first image and the processing unit is configured to perform operations further comprising:
    identifying the first image captured when the first illumination source was illuminated and the second illumination source was not illuminated;
    identifying a second image captured when the first illumination source was not illuminated and the second illumination source was illuminated; and
    analyzing the first image and the second image to determine a position of the object.

26. The method for determining user input of claim 19, wherein the object is a first object, the method further comprising:
    determining user input based on a combination of the first object detected within the anticipated input region and a second object detected within anticipated input region.

27. A non-transitory processor-readable medium for determining user input, comprising processor-readable instructions configured to cause one or more processors to:
    receive an image from a camera while an illumination source is illuminating an area in front of a surface of a display device; and
    analyzing the image received from the camera to determine whether an object within an anticipated input region is substantially in contact with the surface using illumination of the illumination source, wherein the processor-readable instructions configured to cause the one or more processors to analyze the image comprise processor-readable instructions configured to cause the one or more processors to:
        distinguish illuminated objects illuminated by the illumination source from unilluminated objects unilluminated by the illumination source;
        based on distinguishing the illuminated objects illuminated by the illumination source, determine that the illuminated objects are within a predetermined distance from the surface of the display device;
        detect an object within the anticipated input region based on determining that the illuminated objects are within a predetermined distance from the surface of the display device; and
        determine user input based on the object detected within the anticipated input region.

28. The non-transitory processor-readable medium for determining user input of claim 27, wherein the processor-readable instructions configured to cause the one or more processors to control the illumination source comprise processor-readable instructions configured to cause the one or more processors to:
    control the illumination source to illuminate the second area in front of the surface in sequence with images captured by the camera in an alternating pattern such that a first image captured by the camera is captured when the illumination source is illuminated and a second image captured by the camera is captured when the illumination source is not illuminated, wherein the image is the first image.

29. The non-transitory processor-readable medium for determining user input of claim 27 wherein the object is a first object, the processor-readable instructions are further configured to cause the one or more processors to:

determine user input based on a combination of the first object detected within the anticipated input region and a second object detected within anticipated input region.

30. An apparatus for determining user input, the apparatus comprising:

means for receiving an image from a camera while an illumination source is illuminating a first area in front of a surface of a display device; and means for analyzing the image received from the camera to determine whether an object within an anticipated input region is substantially in contact with the surface using illumination of the illumination source, wherein the means for analyzing the image comprises:

means for distinguishing illuminated objects illuminated by the illumination source from unilluminated objects unilluminated by the illumination source;

based on distinguishing the illuminated objects illuminated by the illumination source, means for determining that the illuminated objects are within a predetermined distance from the surface of the display device;

means for detecting an object within the anticipated input region based on determining that the illuminated objects are within a predetermined distance from the surface of the display device; and means for determining user input based on the object detected within the anticipated input region.

* * * * *